United States Patent
Takahashi

(10) Patent No.: US 9,432,448 B2
(45) Date of Patent: Aug. 30, 2016

(54) LOAD DISPERSION SYSTEM, CONTROL METHOD FOR LOAD DISPERSION SYSTEM, AND STORAGE MEDIUM

(71) Applicant: CANON KABUSHIKI KAISHA, Tokyo (JP)

(72) Inventor: Takeshi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 13/926,033

(22) Filed: Jun. 25, 2013

(65) Prior Publication Data

US 2014/0025824 A1    Jan. 23, 2014

(30) Foreign Application Priority Data

Jul. 20, 2012  (JP) ................. 2012-161931

(51) Int. Cl.
  *G06F 15/173*  (2006.01)
  *H04L 29/08*   (2006.01)
  *H04N 1/32*    (2006.01)

(52) U.S. Cl.
  CPC ....... *H04L 67/1002* (2013.01); *H04L 67/1008* (2013.01); *H04L 67/1029* (2013.01); *H04L 67/1038* (2013.01); *H04L 67/28* (2013.01); *H04L 67/327* (2013.01); *H04N 1/3255* (2013.01); *H04N 1/32518* (2013.01); *H04N 1/32534* (2013.01); *H04N 2201/3212* (2013.01)

(58) Field of Classification Search
  CPC ............. H04L 67/1008; H04L 67/28; H04L 67/1029; H04L 67/1038; H04L 67/327
  USPC ........................................... 709/226
  See application file for complete search history.

(56) References Cited

U.S. PATENT DOCUMENTS

| | | | |
|---|---|---|---|
| 7,304,665 B2 | 12/2007 | Takahashi | 348/207.99 |
| 7,653,729 B2 | 1/2010 | Mihira | 709/226 |
| 8,526,021 B2 | 9/2013 | Takahashi | 358/1.13 |
| 8,812,579 B2* | 8/2014 | Rivera | H04L 63/0227 705/38 |
| 2004/0202182 A1* | 10/2004 | Lund | G06F 11/3409 370/395.21 |
| 2006/0123013 A1* | 6/2006 | Ryu | G06T 3/4092 |
| 2013/0066951 A1* | 3/2013 | Agranat | H04J 14/0227 709/203 |
| 2013/0346472 A1* | 12/2013 | Wheeldon | H04L 67/2814 709/203 |
| 2015/0207894 A1* | 7/2015 | De Los Reyes | H04L 67/28 709/219 |

FOREIGN PATENT DOCUMENTS

JP    2007-164527    6/2007

* cited by examiner

*Primary Examiner* — Richard G Keehn
(74) *Attorney, Agent, or Firm* — Fitzpatrick, Cella, Harper & Scinto

(57) ABSTRACT

A scan server or a task server determines a transfer method of either transferring data to an SLB, or transferring data to a central management server determined by the SLB without transiting the SLB according to the data to be transferred, and transfers data to a central management server according to the determined transfer method.

7 Claims, 22 Drawing Sheets

FIG. 7A

| User ID | Ticket ID | Route ID | Parameter |
|---|---|---|---|
| user1 | 00001 | 001 | Width:100,Height:200,FolderPath:¥User¥user1¥ |
| user2 | 00002 | 002 | Uri:http://cloudlservice1/document/ accessToken:abcdefghijklmnxxxxxxxxxxxxxx, expires_in:2011/12/31 12:00:00 |
| user1 | 00003 | 003 | |
| user3 | 00004 | 002 | Uri:http://cloudlservice2/document/ accessToken:opqrstuvwxxxxxxxxxxxxxxxx, expires_in:2011/1/1 12:00:00 |
| user4 | 00005 | 003 | |
| user5 | 00006 | 003 | |

FIG. 7B

| Template ID | Template name | Route ID |
|---|---|---|
| 01 | Scan to cloud 1 | 001 |
| 02 | Scan to cloud 2 | 002 |
| 03 | Jpeg to cloud 1 | 003 |

| Server ID | Server IP | Final transfer date and time |
|---|---|---|
| 01 | 192.168.1.1 | 2012/04/20 11:30:45 |
| 02 | 192.168.1.2 | 2012/04/20 11:30:44 |
| 03 | 192.168.1.3 | 2012/04/20 11:30:47 |

FIG. 13A

| ID | Host name | Status | Shared folder name |
|---|---|---|---|
| 01 | ServerA | 1 | Shared |
| 02 | ServerB | 1 | Shared |
| 03 | ServerC | 1 | Shared |

| File ID | File group ID | Task ID | No | Path | Host name | Creation date | Expiration date |
|---|---|---|---|---|---|---|---|
| 0001 | Job1 | Folder | 1 | \\ServerA\Job1 | ServerA | 2011/1/1 0:01 | 2011/1/8 0:01 |
| 0002 | Job1 | Folder | 1 | \\ServerB\Job1 | ServerB | 2011/1/1 0:01 | 2011/1/8 0:01 |
| 0003 | Job1 | init | 1 | \\ServerA\Job1\init\1.pdf | ServerA | 2011/1/1 0:02 | 2011/1/8 0:02 |
| 0004 | Job1 | init | 1 | \\ServerB\Job1\init\1.pdf | ServerB | 2011/1/1 0:02 | 2011/1/8 0:02 |
| 0005 | Job1 | Task1 | 1 | \\ServerA\Job1\Task1\1.pdf | ServerA | 2011/1/1 0:03 | 2011/1/8 0:03 |
| 0006 | Job1 | Task1 | 2 | \\ServerA\Job1\Task1\2.pdf | ServerA | 2011/1/1 0:03 | 2011/1/8 0:03 |
| 0007 | Job2 | Folder | 1 | \\ServerC\Job2 | ServerC | 2011/1/1 0:10 | 2011/1/8 0:10 |

| Job ID | Route ID | File group ID | Current task ID | Status | Final updating time | Parameter |
|---|---|---|---|---|---|---|
| 1 | 001 | Job1 | Task9 | 0 | 2011/09/15 12:00:00 | Width:100,Height:200,FolderPath:¥User¥user1¥ |
| 2 | 002 | Job2 | Task1 | 0 | 2011/09/15 12:30:00 | Uri:http://cloudservice1/document/ accessToken:opqrstuvwxxxxxxxxxxxx, expires_in:2011/12/31 12:00:00 |
| 3 | 003 | Job3 | Task2 | 1 | 2011/09/15 13:00:00 | |
| 4 | 002 | Job4 | Task5 | 2 | 2011/09/15 12:40:00 | Uri:http://cloudservice2/document/ accessToken:opqrstuvwxxxxxxxxxxxx, expires_in:2011/1/1 12:00:00" |
| ... | | | | | | |

FIG. 16

| Route ID | Sequence Number | Task ID | |
|---|---|---|---|
| 001 | 1 | Task9 | ~1411 |
| 001 | 2 | Task2 | ~1412 |
| 002 | 1 | Task1 | ~1413 |
| 002 | 2 | Task3 | ~1414 |
| 002 | 3 | Task5 | ~1415 |
| 002 | 4 | Task7 | ~1416 |
| 003 | 1 | Task2 | ~1417 |

⋮

LOAD DISPERSION SYSTEM, CONTROL METHOD FOR LOAD DISPERSION SYSTEM, AND STORAGE MEDIUM

BACKGROUND OF THE INVENTION

1. Field of the Invention

The present invention relates to a load dispersion system, a control method for a load dispersion system, and a storage medium.

2. Description of the Related Art

As a mode for conducting various types of processing on a computer, the technology of a cloud computing system or SaaS (Software as a Service) has been proposed. With cloud computing, it is possible to simultaneously process requests from many clients by utilizing numerous computing resources, and by conducting dispersed execution of data conversion and data processing. In order to make good use of the features of cloud computing, systems have been proposed in which numerous jobs are scalably processed by having a server carry out a series of processing tasks on request, and process these simultaneously and in parallel. Such a system is hereinafter referred to as a cloud system.

With respect to construction of a cloud system, it is necessary to have a configuration in which multiple servers conduct load dispersion of requests. For example, the information processing system disclosed in Japanese Patent Laid-Open No. 2007-164527 is a system provided with a load dispersion apparatus which receives a request from a user utilizing a web service, and which decides upon one of multiple web servers, thereby dispersing the load imposed on the servers. A load dispersion apparatus is also referred to as an SLB (software load balancer). An SLB is set up to mediate communication between communication-source and communication-target server groups, and disperses communications from the communication sources among multiple servers based on the (TCP/UDP) port numbers of the communication application.

With the system disclosed in Japanese Patent Laid-Open No. 2007-164527, user requests are transmitted to servers via a load dispersion apparatus, but when the SLB is transited, network bandwidth is restricted by the upper limit of SLB processing performance. In some cases, when the SLB is transited, processing speed is half or less of network bandwidth compared to the case where the SLB is not transited. Therefore, with systems which conduct exchanges of relatively large volumes of binary data such as documents and images, the SLB constitutes a performance bottleneck. As a result, extra time is required in order to process user requests.

SUMMARY OF THE INVENTION

The load dispersion system of the present invention improves processing speed while carrying out server load dispersion by SLB by directly transmitting data from a transmission source to a server without SLB mediation when a large volume of data above a fixed level is received or transmitted.

The load dispersion system of one embodiment of the present invention includes a transfer apparatus which transfers data, multiple saving apparatuses which save the aforementioned data that is transferred, and a dispersion apparatus which determines a saving apparatus to receive transfer of the data in response to a transfer request received from the aforementioned transfer apparatus and in response to a processing status from among the aforementioned saving apparatuses. The transfer apparatus is provided with a determination unit which determines, depending on the data to be transferred, a transfer method that is either to transfer data to the dispersion apparatus, or to transfer data to a saving apparatus determined by the dispersion apparatus without transiting the aforementioned dispersion apparatus, and a transfer unit which transfers data according to the aforementioned determined transfer method.

Further features of the present invention will become apparent from the following description of exemplary embodiments with reference to the attached drawings.

BRIEF DESCRIPTION OF THE DRAWINGS

FIG. 7A and FIG. 7B illustrate an exemplary ticket management DB and an exemplary template management DB.

FIG. 13A and FIG. 13B illustrate server information and file pass information managed by a database server.

FIG. 15 illustrates job information managed by a database server.

FIG. 16 illustrates route information managed by a database server.

DESCRIPTION OF THE EMBODIMENTS

Figure 1:
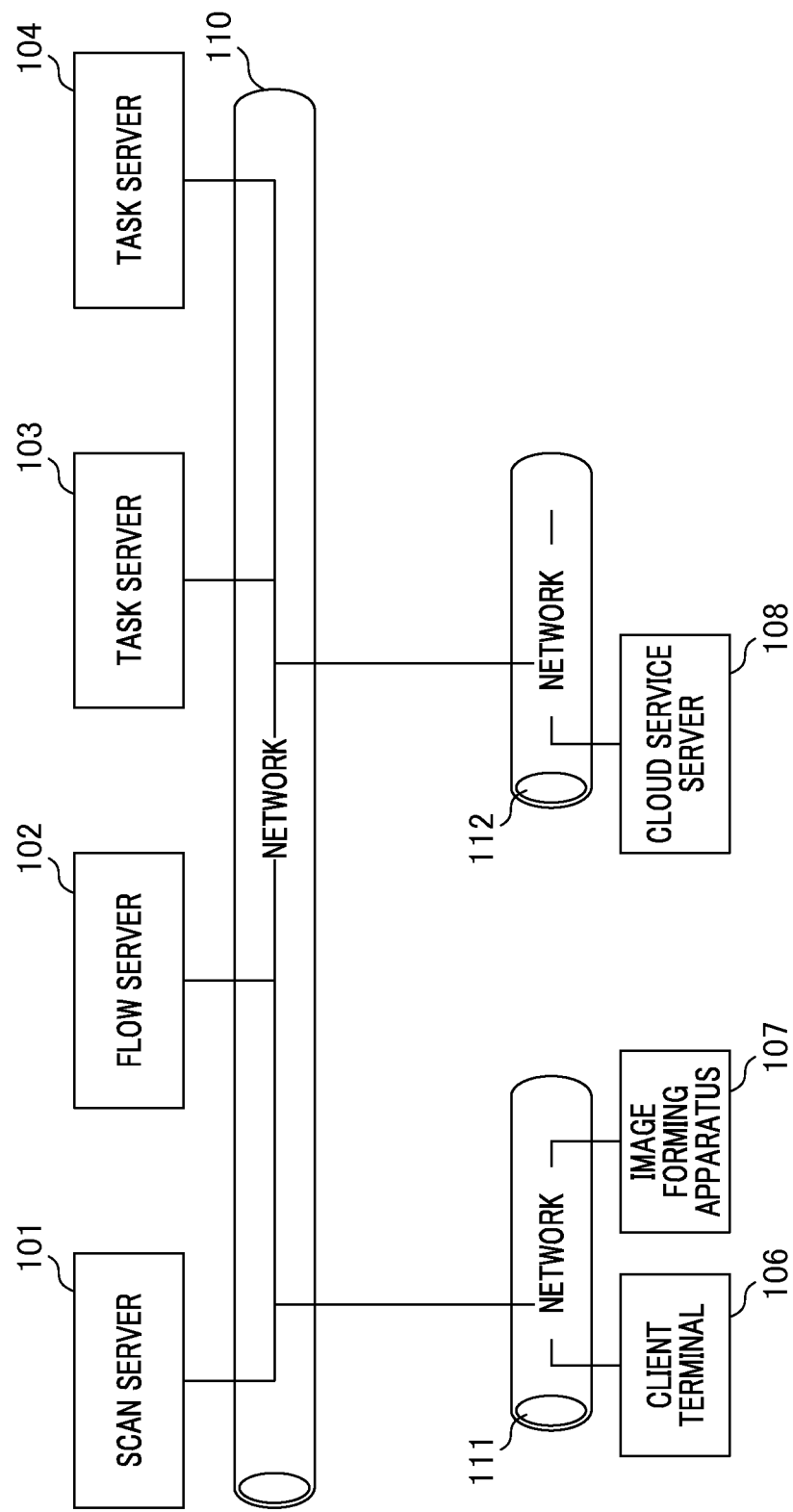
FIG. 1 shows an overall configuration of an information processing system of the present embodiment.

FIG. 1 is a diagram which illustrates an overall configuration of an information processing system of an embodiment of the present invention. The information processing system of the present embodiment is a cloud system, and provides image processing services to a user of a client terminal 106. The information processing system of FIG. 1 is provided with a scan server 101, a flow server 102, task servers 103 and 104, a client terminal 106, an image forming apparatus 107, and a cloud service server 108.

The scan server 101, the flow server 102, and the task servers 103 and 104 are communicably connected via a network 110. The scan server 101, the flow server 102, and the task servers 103 and 104 are communicably connected with the client terminal 106 and the image forming apparatus 107 via the network 110 and a network 111. In addition, the scan server 101, the flow server 102, and the task servers 103 and 104 are communicably connected with the cloud service server group 108 via the network 110 and a network 112. The task servers 103 and 104, the client terminal 106, the image forming apparatus 107, and the cloud service server 108 are connected in multiple units. The networks 110 to 112 are, for example, a LAN such as the Internet, a WAN, a telephone circuit, a dedicated digital circuit, an ATM or frame relay circuit, a cable television circuit, a data broadcasting wireless circuit, or the like. LAN is an abbreviation for Local Area Network. WAN is an abbreviation for Wide Area Network. ATM is an abbreviation for Asynchronous Transfer Mode.

The networks 110 to 112 may be communication networks which are implemented by a combination of the above-enumerated examples from LAN to data broadcasting wireless circuit. That is, it is sufficient that the networks 110 to 112 are capable of transmitting and receiving data. In this example, as the information processing system of the present embodiment is a cloud system, the networks 110 and 112 are the Internet, and the network 111 is a network within a corporation or a service provider network.

The scan server 101, the flow server 102, and the task servers 103 and 104 have multiple server computers. This server computer group constitutes a cloud system that provides cloud services to a user. In this example, the image forming apparatus 107 executes scanning in response to a request from the client terminal 106 to thereby acquire image data, and inputs the acquired image data to the scan server 101. The scan server 101 inputs the job corresponding to the pertinent image data to the flow server 102. The flow server 102 manages the job that is input. The task servers 103 and 104 asynchronously issue acquisition requests for the job managed by the flow server 102. In this example, the job is composed of multiple tasks. For example, in the case where a job issued according to a user request is a scan job, one may conceive of the case where there is execution of a step in which image processing of a scanned image is conducted, and a step in which the scanned image that was subjected to image processing is saved. In the specification of the present invention, an individual job is constituted from multiple tasks by delimiting the respective steps by a unit that is referred to as a "task." The advantage of this format is that it is possible to conduct a variety of job processing by combining multiple tasks. Among the multiple tasks included in the managed job, the flow server 102 delivers a task corresponding to a task server that originated an acquisition request to the task server that originated the acquisition request. The task server that receives the task performs specified job processing. For example, the task server conducts image processing on image data to be processed, and conducts processing which transmits the image data to another cloud service server group that provides a file sharing function.

The system components from the scan server 101 to the cloud service server 108 are made publicly available on the Internet by various corporations, and these are also executed by multiple server computers. The client terminal 106 is, for example, a desktop personal computer, a notebook personal computer, a mobile personal computer, a PDA (personal data assistant), or the like. The client terminal 106 may also be a mobile phone with a built-in program performance environment. The client terminal 106 incorporates an environment in which the programs of web browsers (Internet browsers, www browsers, browsers provided for use with the World Wide Web) and the like are executed.

Figure 2:
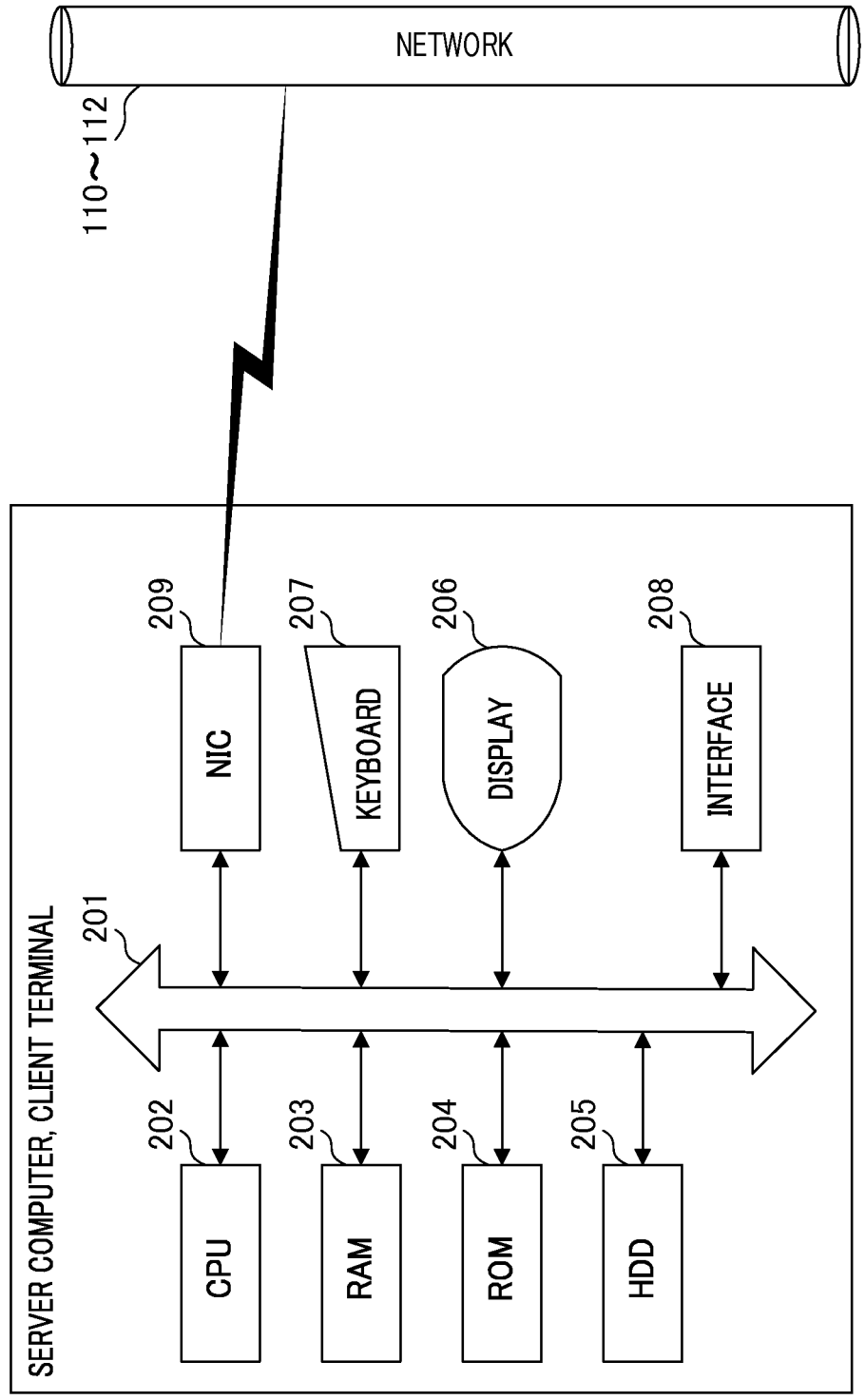
FIG. 2 is an exemplary hardware block diagram of a client terminal and a server computer which implements a scan server, a flow server, and task servers.

FIG. 2 is an exemplary hardware block diagram of the client terminal 106 and a server computer which implements a scan server 101, a flow server 102, task servers 103, 104, as well as an SLB 1206, central management servers 1200, 1201, and file servers 1202, 1203 and 1204, and a database server 1205 that are described below with reference to FIG. 9. The client terminal 106 and the server computer are provided with a CPU 202, a RAM 203, a ROM 204, and an HDD 205. CPU is an abbreviation for Central Processing Unit. RAM is an abbreviation for Random Access Memory. ROM is an abbreviation for Read Only Memory. HDD is an abbreviation for Hard Disk Drive. The client terminal 106 and the server computer are also provided with a display 206, a keyboard 207, an interface 208, and an NIC 209. NIC is an abbreviation for Network Interface Card. The CPU 202 conducts overall control of the apparatus. The CPU 202 conducts control which runs application programs, OS and the like that are stored in the HDD 205, and which temporarily stores information, files and the like that are required for program execution in the RAM 203. OS is an abbreviation for "operating system." The ROM 204 is a memory unit, and internally stores various types of data such as basic I/O programs. The RAM 203 is a temporary storage unit, and functions as a main memory, work area and the like of the CPU 202. The HDD 205 is an external storage unit, and functions as a high-capacity memory that stores application programs of a web browser or the like, service group programs, OS, related programs, and the like.

The display 206 is a display unit, and displays commands and the like that are input from the keyboard 207. The interface 208 is an external device I/F, and connects a printer, USB equipment, or peripheral equipment. The keyboard 207 is an instruction input unit. A system bus 201 governs the flow of data in the apparatus. All components from the CPU 202 to the interface 208 are connected to the system bus 201. The network interface NIC 209 conducts data exchange with external devices via the interface 208 and the networks 110 to 112. Note that, this pertains to the example of hardware configuration shown in FIG. 2, but one is not limited to the exemplary configuration of FIG. 2. For example, the storage destination of data and programs may be any one of the RAM 203, the ROM 204, or the HDD 205, depending on their features.

Figure 3A:
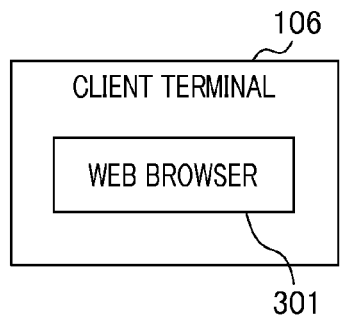
FIG. 3A and FIG. 3B illustrate exemplary configurations of a client terminal and an image forming apparatus.

FIG. 3 consists of diagrams which show exemplary configurations of a client terminal and an image forming apparatus. FIG. 3A illustrates an exemplary configuration of the client terminal 106. The client terminal 106 is provided with a web browser 301. The system is actually a program that is stored in the ROM 204, and is implemented by being read out to the RAM 203, and run by the CPU 202. In FIG. 3A, transmission of requests to a web application provided by the scan server 101 (FIG. 1), and display of responses and the like are conducted using the web browser 301. A user who utilizes the cloud service uses the web browser 301 of this client terminal 106 to utilize the cloud service.

Figure 3B:
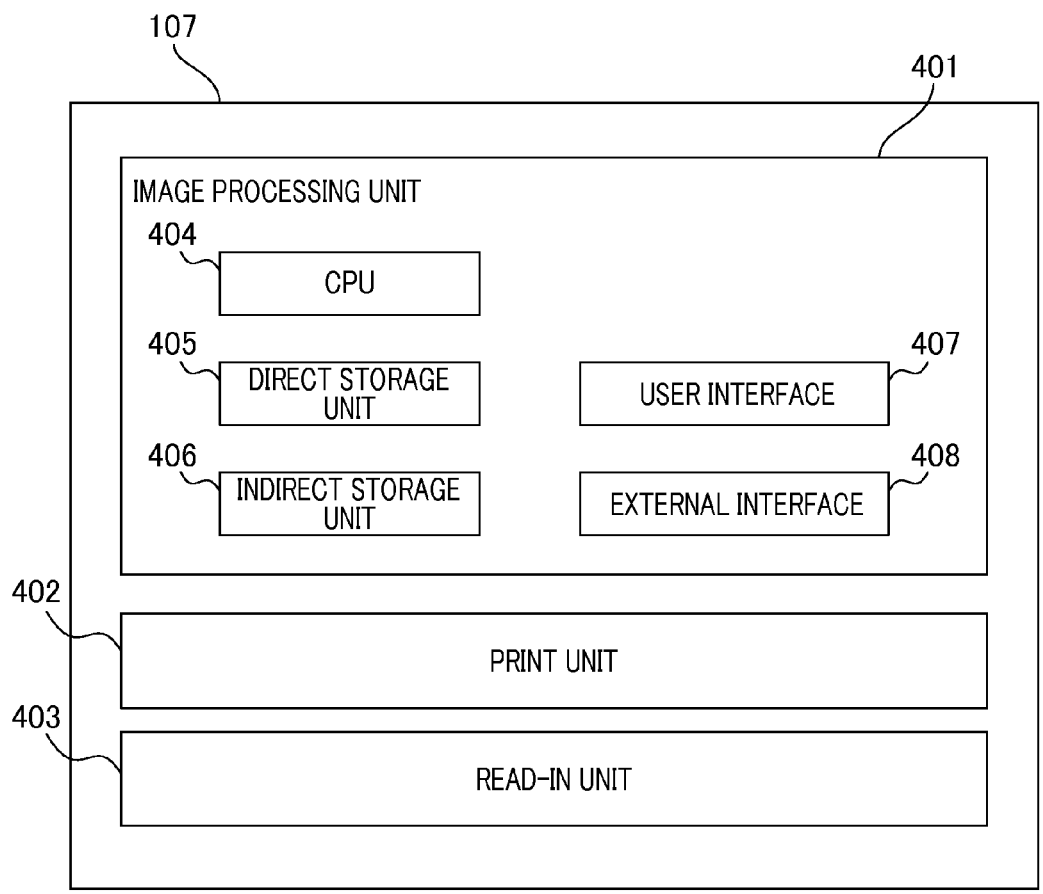

FIG. 3B illustrates an exemplary configuration of the image forming apparatus 107. In this example, the image forming apparatus 107 is an apparatus which has a scan function and a print function. Note that, to implement a scan service, the image forming apparatus 107 may also be a scan-dedicated apparatus without a print function. The image forming apparatus 107 is provided with an image processing unit 401, a printing unit 402, and a reading unit 403. The image processing unit 401 executes image processing. For example, the image processing unit 401 generates print data according to print settings. The printing unit 402 conducts print-out of print data generated by the image processing unit 401 to a medium (e.g., a paper medium). The reading unit 403 reads image data using, for example, a scanning apparatus that is not illustrated in the drawing. The image processing unit 401 is provided with a CPU 404, a direct storage unit 405, an indirect storage unit 406, a user interface 407, and an external interface 408.

The CPU 404 runs specified programs, and issues instructions for various types of control of the image forming apparatus 107. With respect to the CPU 404, The direct storage unit 405 is a work memory which is used when the CPU 404 runs a program. A program run by the CPU 404 is loaded into the direct storage unit 405. The CPU 404 may also be a multiprocessor.

The direct storage unit is implemented by RAM. The indirect storage unit 406 stores various types of programs including application programs and platform programs. Whenever the CPU 404 runs the various programs stored in the indirect storage unit 406, these various programs are transferred to the direct storage unit 405. The indirect storage unit 406 is implemented by an SSD (solid-state drive) or an HDD.

In this example, a platform program which implements a platform capable of running a new application proprietarily developed by a user on the image forming apparatus 107 is stored in the indirect storage unit 406. According to the platform, it may be possible to customize the operating screen of the user's image forming apparatus 107.

A description is given below of a platform implementation method. The CPU 404 transfers the platform program stored in the indirect storage unit 406 to the direct storage unit 405. Upon completion of transfer, the CPU 404 is in a state where it is capable of running the platform program (e.g., Java®). In this example, running of the platform program by the CPU 404 is referred to as platform activation. The platform is operated on firmware of the image forming apparatus 107. The platform program provides an environment for execution of application programs described by object-oriented.

Next, a detailed description is given of a method for running an application program on a platform. In this example, scan software which transmits a scanned image to a cloud service is operated on the platform. The scan software receives a list of scan tickets from the scan server 101 that is connected via a network by a communication protocol such as HTTP (Hyper Text Transfer Protocol). A scan ticket records settings concerning how to take in image data during scanning, and information about subsequent processing flows. A software unit implemented by running scan software is hereinafter referred to as a scan software unit.

A user selects a scan ticket from a list of scan tickets displayed in the scan software unit, and can complete scanning by conducting read-in of a manuscript. The scan software unit transmits both the information of the scan ticket selected by the user and the scanned image data to the scan server 101. In this manner, control of the image forming apparatus 107 can be conducted by running an application program on a platform.

Next, a description is given of a method for running an application program. The activated platform transfers the application program stored in the indirect storage unit 406 to the direct storage unit 405. Upon completion of the transfer, the platform is in a state where it can run the application program. The platform then runs the application program. A platform function which can be provided by running an application program in this manner is referred to as a platform application in this example. Furthermore, it is possible for the platform to carry out portions of the various processing of the flowcharts disclosed in the present embodiment.

The user interface 407 receives processing requests from a user. For example, the user interface 407 receives signals corresponding to an instruction inputted by a user through a keyboard, a mouse, or the like. The external interface 408 is capable of receiving data from external devices and transmitting data to external devices. The aforementioned external devices are, for example, add-on storage devices such as an add-on HDD or an add-on USB memory, or separate devices such as a separate host computer or image forming apparatus connected via a network. The image forming apparatus 107 is capable of communicating with the scan server 101 and the client terminal 106 via the networks 110 and 111.

Next, a description is given of the respective servers of the scan server 101 and the task servers 103 and 104 that provide the cloud service. Furthermore, in conjunction with the description of the respective servers, a description is also given of the scan processing flow.

Figure 4:
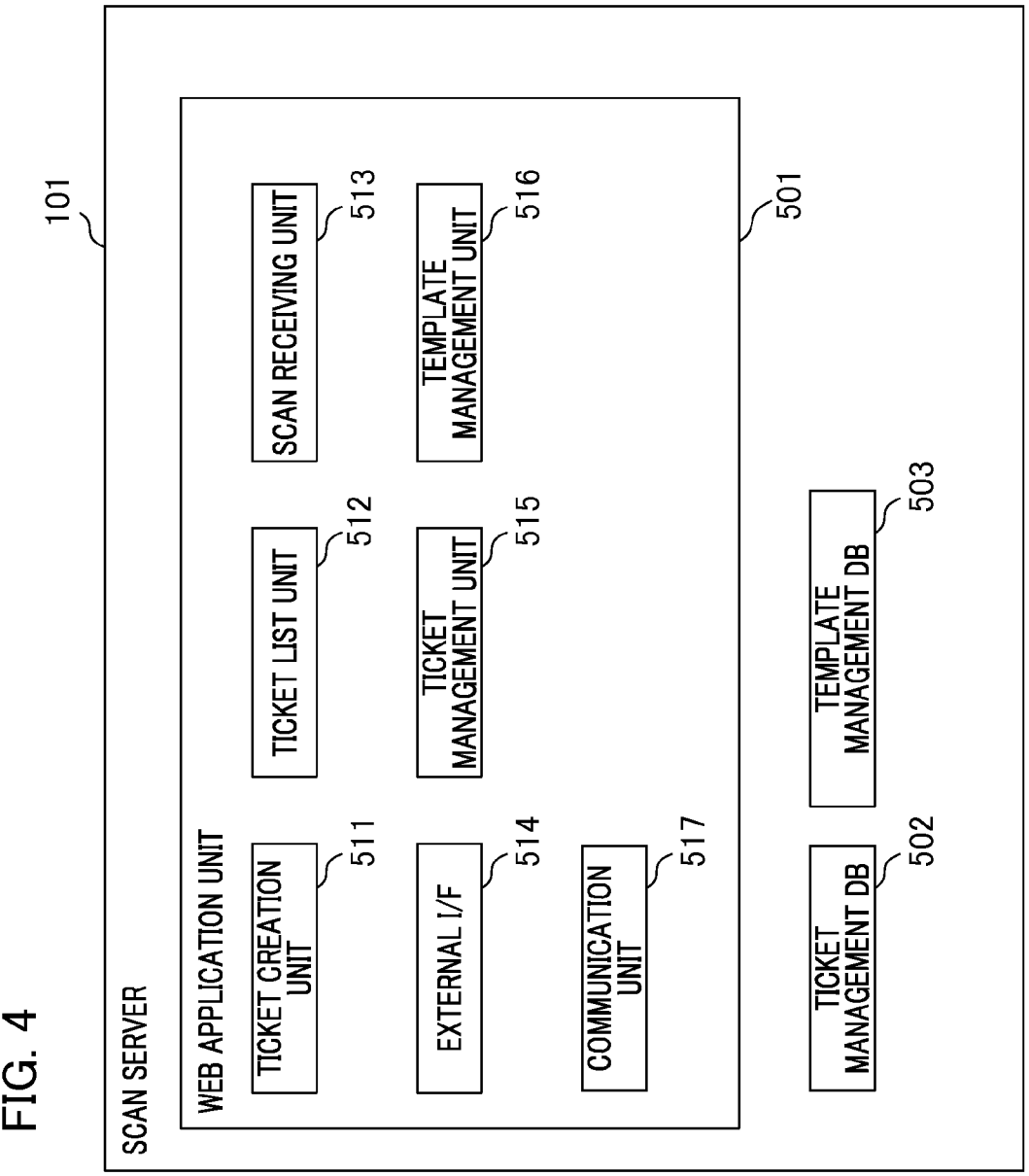
FIG. 4 illustrates an exemplary configuration of a scan server.

FIG. 4 is a diagram which illustrates an exemplary configuration of the scan server 101. The scan server 101 is a server which provides a scan function in a cloud service. This service is actually a program that is stored in the ROM 204, and is implemented by being read out to the RAM 203 and run by the CPU 202. The scan server 101 is provided with a web application unit 501, a ticket management DB unit 502, and a template management DB unit 503. The scan server 101 is provided to the user with execution of various types of processing by these components.

The web application unit 501 offers application programs that provide scan functions. The web application unit 501 is provided with a ticket creation unit 511, a ticket list unit 512, a scan receiving unit 513, an external I/F 514, a ticket management unit 515, a template management unit 516, and a communication unit 517. The ticket creation unit 511 carries out a series of functions that serve to create a scan ticket. A scan ticket is definition information which includes settings for the time when scanning of a manuscript is conducted by the image forming apparatus 107, definitions of subsequent processing flows, parameters for tasks to be executed in the respective processing flows, and the like.

A description of scan ticket creation processing is given as follows. The web browser 301 of the client terminal 106 issues a ticket creation screen request (in this example, a scan ticket creation screen request) to the scan server 101 in accordance with user manipulation. The ticket creation unit 511 provides a ticket creation screen (in this example, a scan ticket creation screen) to the client terminal 106 in accordance with the ticket creation screen request. The web browser 301 of the client terminal 106 displays the scan ticket creation screen.

Figure 5:
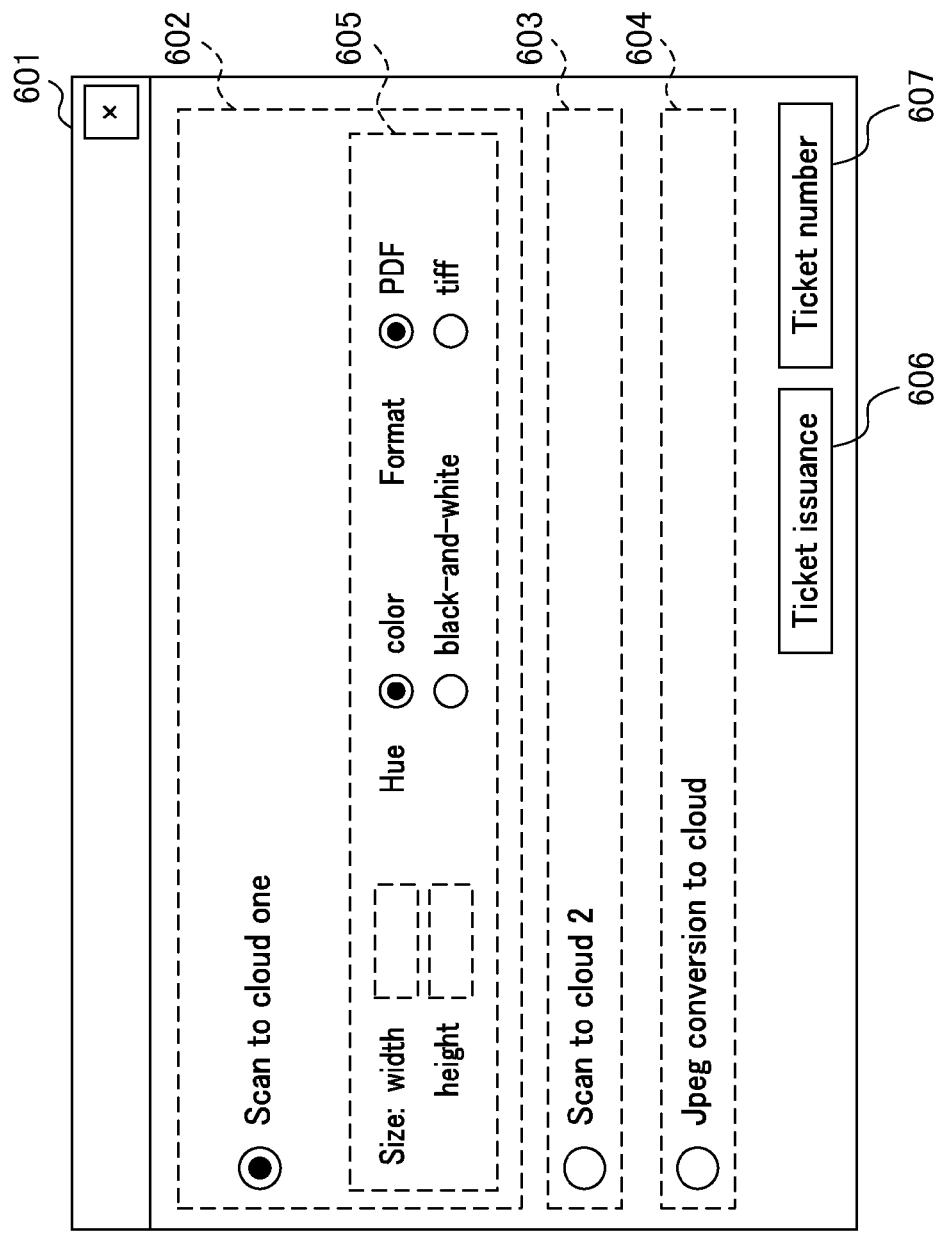
FIG. 5 illustrates an exemplary scan ticket creation screen.

FIG. 5 is a diagram which illustrates an exemplary scan ticket creation screen. A scan ticket creation screen 601 displays templates 602 to 604. A template is definition information that serves to establish settings for image processing (e.g., scan processing). For example, the template 602 defines processing that transmits image data obtained by scanning to the scan server 101. The template management unit 516 manages the templates stored in the template management DB 503.

The ticket creation unit 511 acquires the templates from the template management DB 503, and provides the web browser 301 with a scan ticket creation screen including the acquired templates. When the user selects a template to be executed from among the templates displayed on the scan ticket creation screen 601, the web browser 301 displays it on a detailed settings screen 605. The detailed settings screen 605 is a screen for conducting detailed ticket settings.

In the example shown in FIG. 5, the templates and the detailed settings screen 605 are displayed in the same screen, but the web browser 301 may also be configured so that the detailed settings screen 605 opens in a screen (a separate window) that is different from the screen in which the templates are displayed. The user can establish scan settings in the detailed settings screen 605 according to the selected template. For example, as an example of scan settings, and as shown in FIG. 5, there are settings such as size, color, hue including black-and-white, and scan data format. When the user presses down a ticket issuance button 606 after establishing the detailed settings, a scan ticket creation request is issued to the scan server 101 from the web browser 301. A scan ticket creation request is a request which seeks creation of a scan ticket, and includes the information of the ticket settings established in the scan ticket creation screen.

The ticket creation unit 511 creates a scan ticket based on the ticket setting information included in the scan ticket creation request, and instructs the ticket management unit 515 to save the information (ticket information) relating to the scan ticket. The ticket management unit 515 saves the ticket information in the ticket management DB unit 502 in accordance with the instruction from the ticket creation unit 511. The external I/F 514 communicates with the scan software unit which operates in the image forming apparatus 107. Specifically, the external I/F 514 receives access to the functions of the ticket list unit 512 and the functions of the scan receiving unit 513 from the scan software unit. The ticket list unit 512 generates a ticket list based on the ticket information saved in the ticket management unit 515 in accordance with a request from the image forming apparatus 107, and returns it to the image forming apparatus 107. The image forming apparatus 107 displays the acquired ticket list on a ticket list screen.

Figure 6:
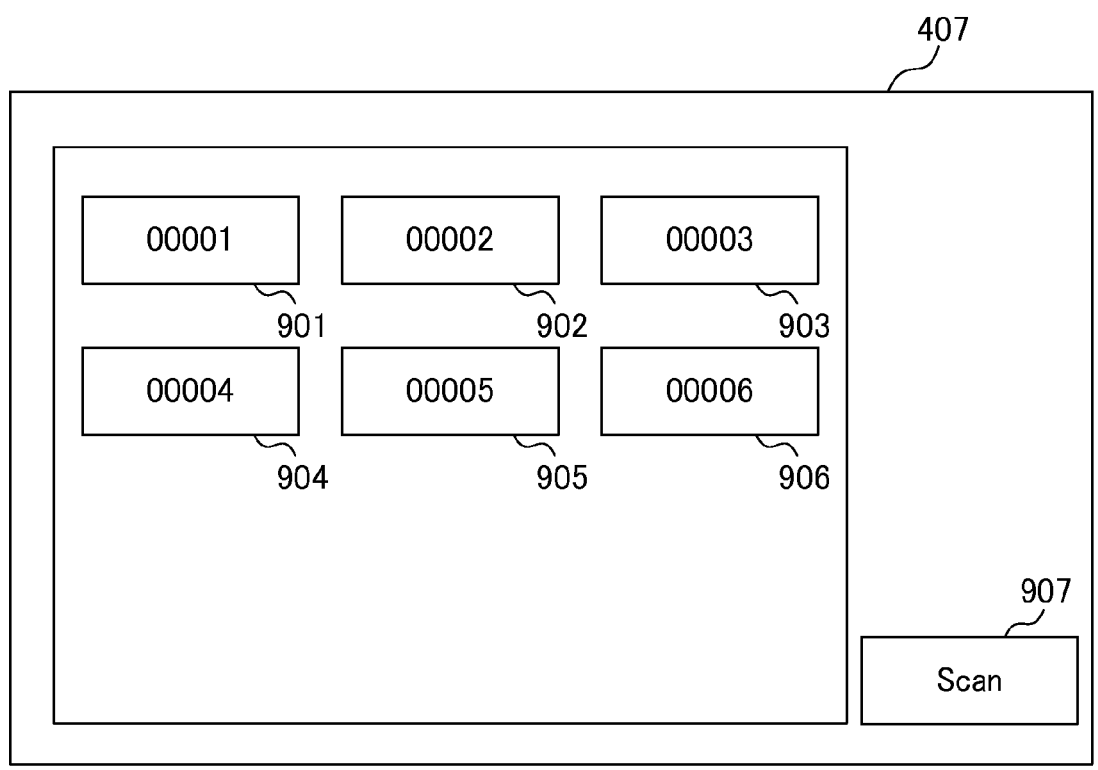
FIG. 6 illustrates an exemplary ticket list screen.

FIG. 6 is a diagram which illustrates an exemplary ticket list screen. In this example, tickets 901 to 906 (in this example, scan tickets) are displayed in a ticket list screen 407. The user selects any one of the scan tickets displayed in the ticket list screen 407, installs paper in the scanning apparatus attached to the image forming apparatus 107, and presses down on a scan button 907, whereupon scanning is executed. The image forming apparatus 107 then transmits the scan ticket selected in the ticket list screen and the image data obtained by scanning execution to the scan server 101. The scan receiving unit 513 with which the scan server 101 is provided receives the scan ticket and the image data from the image forming apparatus 107. The scan receiving unit 513 then inputs the received image data into the flow server 102.

FIG. 7 is a diagram which illustrates an exemplary ticket management DB and an exemplary template management DB. FIG. 7A illustrates an exemplary ticket management DB 502. The information of the ticket saved by the ticket management DB 502 includes the data items of a user ID 701, a ticket ID 702, a route ID 703, and a parameter 704. The user ID 701 is identification information which uniquely identifies a user who has created a ticket. The ticket ID 702 is identification information which uniquely identifies a ticket. The ticket ID 702 is generated by the ticket creation unit 511 when the ticket issuance button 606 is pressed in the scan ticket creation screen shown in FIG. 5, and is saved in the ticket management DB 502.

The route ID 703 is identification information which uniquely identifies route information. Route information is information which shows processing (e.g., scan processing) corresponding to a template that is selected in the scan ticket creation screen 601. Specifically, route information is information pertaining to a route that connects the respective tasks contained in a job whose processing is implemented according to a template, and includes processing sequence information which shows the processing sequence of the job. That is, route information is information that serves to define the connection of tasks using a unit referred to as a "route."

In the case where a user selects a template, and executes scanning, scan data is processed in a task sequence defined in association with the route ID 703. The "task" referred to here represents each processing step configuring a job, and a task server is a server which has the function of processing this "task." In other words, job processing is the processing of one or more tasks, and job processing is, for example, conducted by having multiple task servers cooperate to execute the respective tasks. The parameter 704 is scan setting information that is set in the detailed settings screen 605 shown in FIG. 5.

FIG. 7B is a diagram which illustrates an exemplary template management DB. Template information is set in the template management DB 503. Template information is information which links the route information managed by the route information management DB 1605 described below with reference to FIG. 12 and the templates displayed in the ticket creation screen. Template information has the data items of a template ID 801, a template name 802, and a route ID 803. The template ID 801 is identification information which uniquely identifies a template. The template name 802 is a name which identifies a template. The template name is displayed in the ticket creation screen 601 of FIG. 5. The route ID 803 is an external key to a route ID 1401 containing route information managed by a route information management DB 1605 (FIG. 13).

Figure 8:
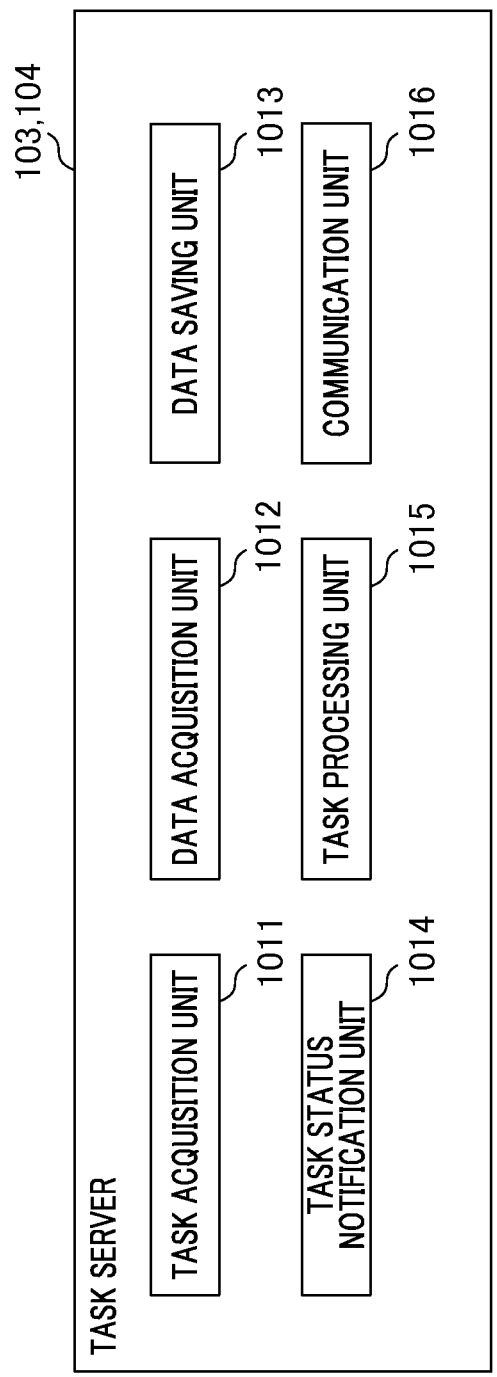
FIG. 8 illustrates an exemplary configuration of a task server.

FIG. 8 is a diagram which shows an exemplary task server configuration. In this example, the configuration of the task server 103 is described. This system is actually a program that is stored in the ROM 204, and is implemented by being read out to the RAM 203 and run by the CPU 202. Each task server is a service which implements component functions that serve to implement a cloud scan server. The configuration of the task server 104 is identical to the configuration of the task server 103. The task server 103 conducts OCR processing with respect to image data, and conducts processing which embeds text data resulting from OCR in the image data. Moreover, the task server 103 also functions as a transfer apparatus, issuing requests to transfer, upload, and store image data to a specified server that provides a storage function in the cloud service server group 108. Each task server conducts processing corresponding to an assigned task, and has a function providing the respective service.

As shown in FIG. 8, the task server 103 is provided with a task acquisition unit 1011, a data acquisition unit 1012, a data saving unit 1013, a task status notification unit 1014, a task processing unit 1015, and a communication unit 1016. The task acquisition unit 1011 periodically issues an inquiry to the flow server 102 via the communication unit 1016 to acquire a task that can be processed by the task server 103. The data acquisition unit 1012 acquires image data to be processed from the flow server 102 based on task information acquired by the task acquisition unit 1011. The task processing unit 1015 conducts various processing with respect to image data acquired by the data acquisition unit 1012. In addition, the task processing unit 1015 delivers the processing results of the task processing unit 1015 to the data saving unit 1013. The data saving unit 1013 saves the processing results received from the task processing unit 1015 in the flow server 102. The task status notification unit 1014 periodically issues a status notification to the flow server 102.

Figure 9:
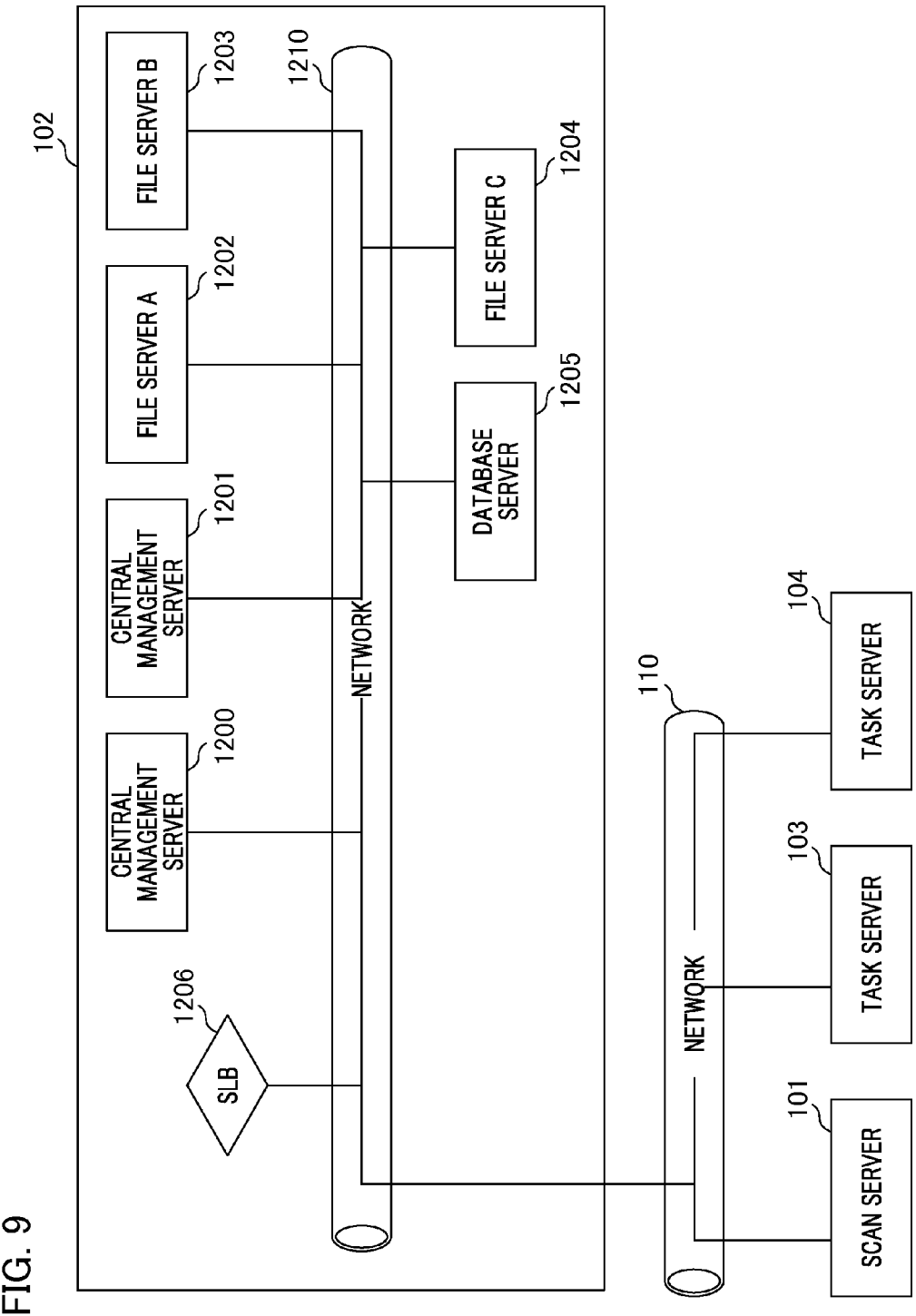
FIG. 9 is an outline of a system block diagram of a flow server group.

FIG. 9 illustrates a load dispersion system of the present embodiment. The load dispersion system is provided with the scan server 101, the flow server 102, and the task servers 103 and 104. A detailed description is given below of the flow server 102 with reference to FIG. 9. The flow server 102 is the central server in the invention of the present specification, and is a server which conducts route management, job management, and file management. The flow server 102 is provided with central management servers 1200 and 1201, a file server A 1202, a file server B 1203, a file server C 1204, a database server 1205, and an SLB 1206. The flow server 102 is communicably connected to the scan server 101 and the task servers 103 and 104 via the network 110. The respective servers with which the flow server 102 is provided are also communicably connected via a network 1210. The network 1210 is connected to the network 110, and the network 1210 is a communication network capable of the same data transmission and receipt as the network 110.

Figure 11:
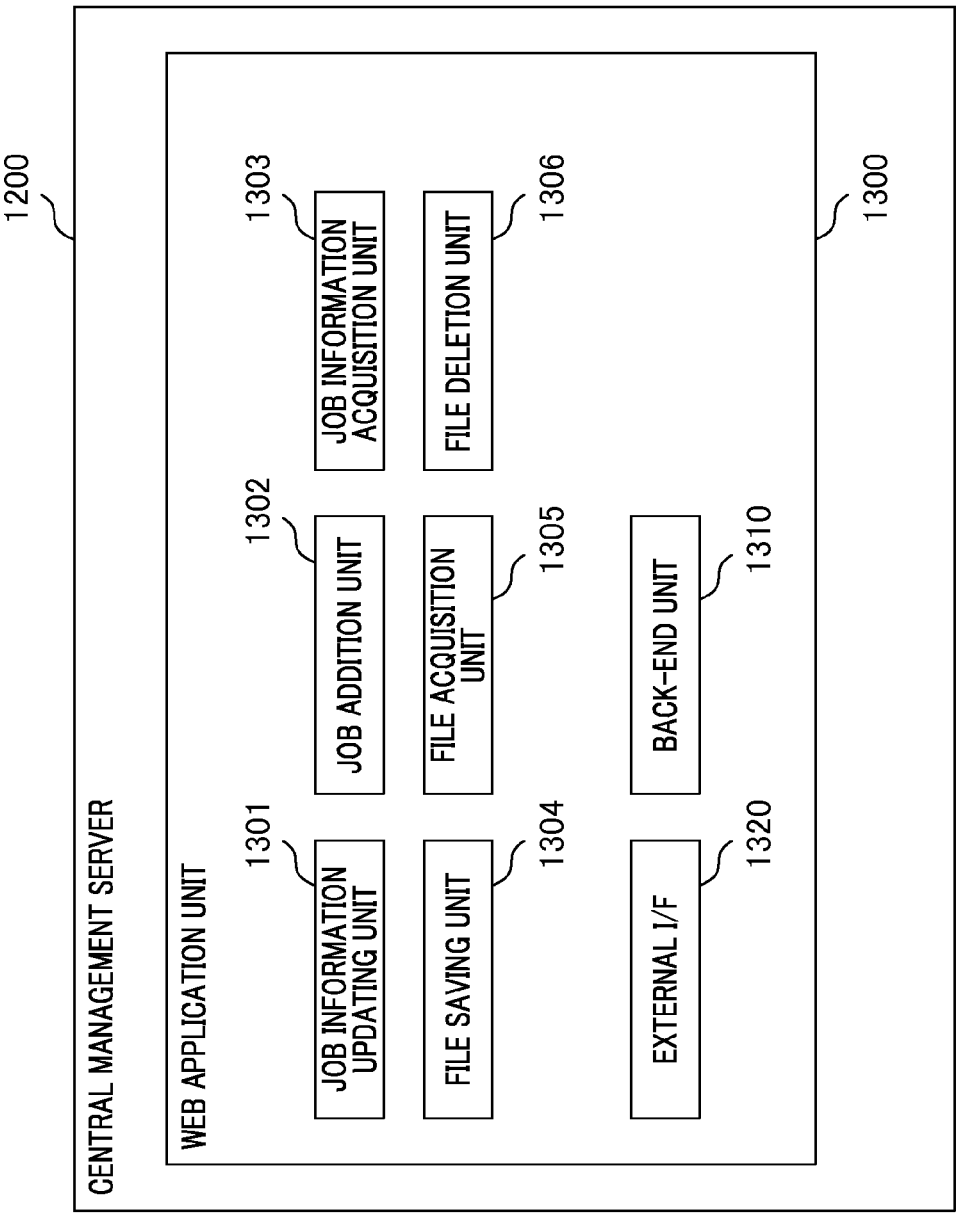
FIG. 11 is a system block diagram of a central management server.

The central management servers 1200 and 1201 are ordinarily run on a server computer, and the detailed functions thereof are described in FIG. 11. The file servers 1202 to 1204 are ordinarily run on a server computer, and have the functions of saving, deleting, and acquiring file data as necessary. In the present embodiment, file data is binary data such as image data, and is sometimes simply denoted by the word "file". The database server 1205 is ordinarily run on a server computer, and the detailed functions thereof are described with reference to FIG. 12. In FIG. 9, the central management servers 1201 and 1202, and the file servers A 1202, B 1203, and C 1204 are shown, but the quantities are not limited thereto. The number of central management servers and file servers may be increased or decreased according to the volume of communication data.

The addresses of the central management servers 1200 and 1201 are registered in the SLB 1206, and when a request is sent to the SLB 1206, the SLB 1206 has the function of allotting and transferring the request to either the central management server 1200 or 1201. The purpose of the allotment of this request is so that access is not concentrated on and load is not biased toward a single central management server. That is, the SLB 1206 functions as a dispersion apparatus which determines a central management server according to the processing status of the central management servers 1200 and 1201 in response to a transfer request received from the scan server 103 or 104. As for the method of request allotment, various methods are possible. For example, there is the round-robin system in which requests are sequentially allotted to the central management servers 1200 and 1201, and the minimum connection method in which the number of connections to each central management server being accessed by the SLB 1206 is considered, and allotment is conducted to the central management server with the smallest number of connections. In the present embodiment, there is no particular mention of the allotment method of the SLB 1206, and there are no particular limitations thereon, provided that it is an allotment system that is commonly provided by the SLB 1206.

Figures 10A, 10B:
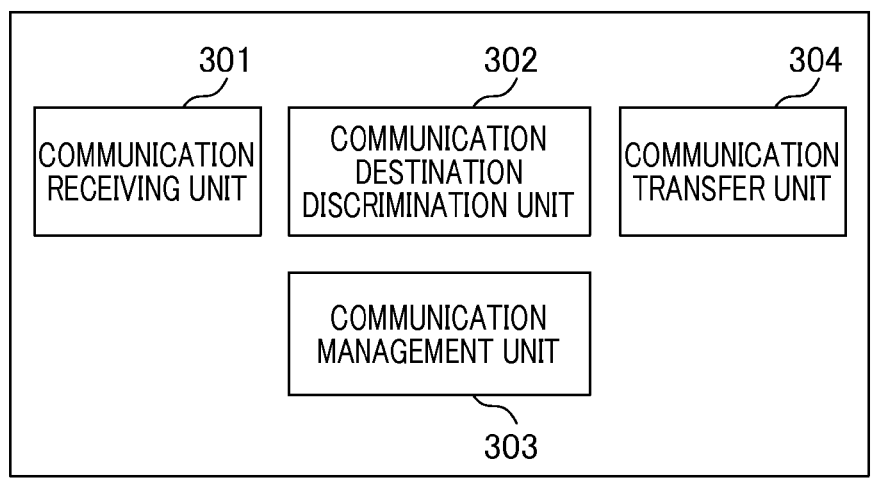
FIG. 10A and FIG. 10B illustrate an SLB system configuration and a management table managed by an SLB.

FIG. 10 illustrates an exemplary system configuration of the SLB 1206, and an exemplary management table managed by an SLB. FIG. 10A is a system block diagram of the SLB 1206. This system is actually a program that is stored in the ROM 204, and is implemented by being read out to the RAM 203 and run by the CPU 202. As shown in FIG. 10A, a communication receiving unit 301 has the function of receiving communications from the scan server 101 and the task servers 103 and 104 that are the communication sources. A communication management unit 303 has saving and management functions with respect to the multiple central management servers 1200 and 1201 to which communications are to be dispersed. FIG. 10B shows an example of a management table managed by the communication management table 303. A server ID 311 is an ID which uniquely identifies a registered central management server. A server IF 312 is an IP address of a central management server to which communications are to be dispersed. A final transfer date and time 313 is a date and time of a communication previously forwarded to the pertinent server. A communication destination discrimination unit 302 has the function of discriminating to where a communication received by the communication receiving unit 301 is to be forwarded. For example, in the case where allotment is conducted by the round-robin system, the communication destination discrimination unit 302 forwards the communication to the server IP whose final transfer date and time 313 is the oldest date and time.

FIG. 11 is a system configuration of a central management server. This system is actually a program that is stored in the ROM 204, and is implemented by being read out to the RAM 203 and run by the CPU 202. The central management servers 1200 and 1201 are servers which implement a web application unit 1300. The web application unit 1300 is provided with a job information updating unit 1301, a job adding unit 1302, a job information acquisition unit 1303, a file saving unit 1304, a file acquisition unit 1305, a file deletion unit 1306, a back-end unit 1310, and an external I/F 1320.

The central management servers 1200 and 1201 function as saving apparatuses which save file data transferred from the scan server 101 or the task server 103 or 104. The file saving unit 1304 of the web application unit 1300 functions as a saving unit. Upon receipt of file data in response to requests from the scan server 101 or the task servers 103 and 104, the received files are stored in the file saving unit 1304. The file saving unit 1304 also has a function which manages a storage destination path. When there is a file acquisition request from the task server 103 or 104, the file acquisition unit 1305 acquires the saved file data from the file saving unit 1304, and returns it to the task server 103 or 104. When there is a file deletion request from the scan server 101 or the task server 103 or 104, the file deletion unit 1306 deletes the saved file(s). By utilizing the web application unit 1300, the scan server 101 and the task servers 103 and 104 can save, acquire, and delete files regardless of the storage destination paths of the files or the status of the file server.

Upon receiving job information from the scan server 101, the job information acquisition unit 1303 stores the received job information in the job adding unit 1302. The job adding unit 1302 receives a job input request issued from the scan server 101, and stores the job information in the database server 1205 shown in FIG. 12. The job information updating unit 1301 has the function of extracting and updating job information in response to requests from the task server 103 or 104. The external I/F 1320 is an I/F which receives external inquiries for the central management servers, and receives requests for addition, information acquisition, and updating pertaining to jobs, as well as for saving, acquisition, and deletion of files, and the like from the scan server 101 and the task servers 103 and 104.

Figure 12:
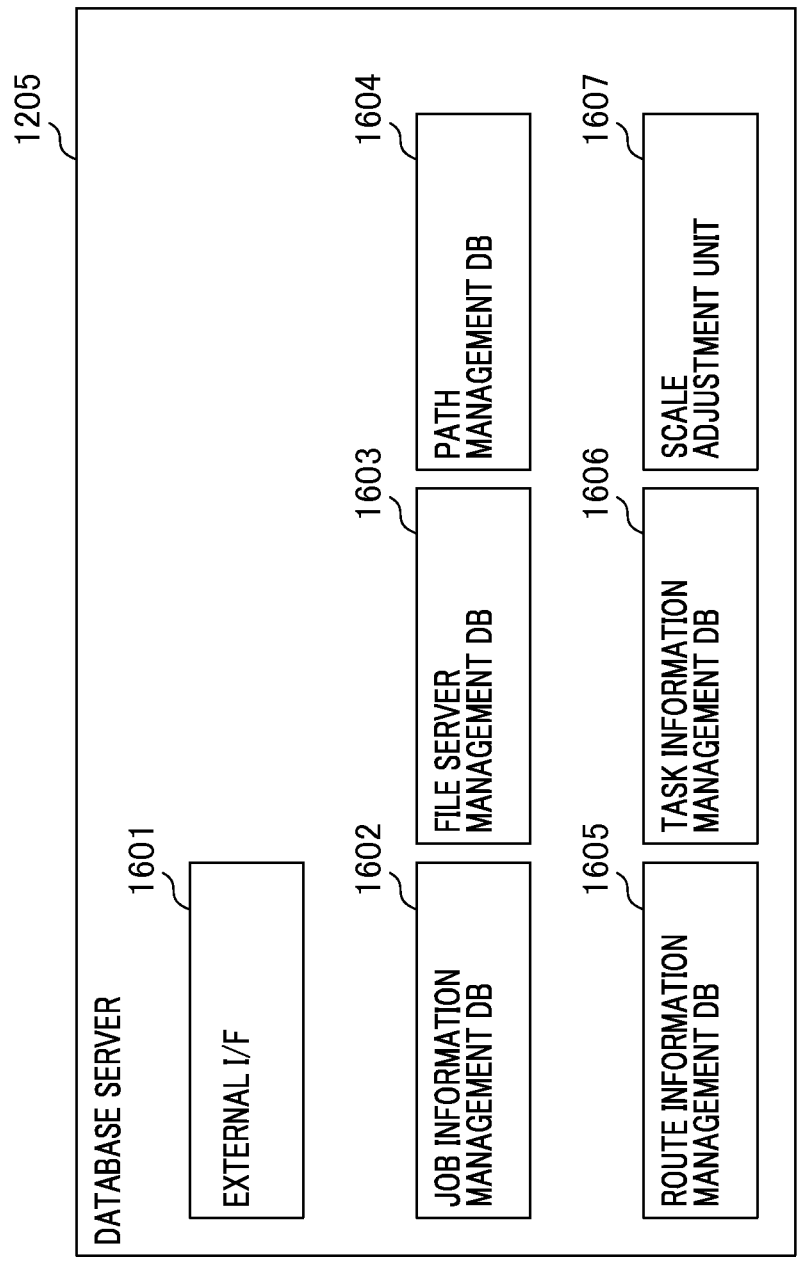
FIG. 12 is a system block diagram of a database server.

FIG. 12 is a system configuration of the database server 1205. This system is actually a program that is stored in the ROM 204, and is implemented by being read out to the RAM 203 and run by the CPU 202. The database server 1205 is provided with an external I/F 1601, a job information management DB 1602, a file server management DB 1603, a path management DB 1604, a route information management DB 1605, a task information management DB 1606, and a scale adjustment unit 1607.

The external I/F 1601 is an I/F for accessing the various DBs with which the database server 1205 is provided in response to requests from the central management servers 1200 and 1201. The job information management DB unit 1602 manages the status of each prepared job and the ID of the data handled by each job. The detailed contents of what is managed by the job information management DB unit 1602 are described in FIG. 15, and a description of the particulars of the job information management DB unit 1602 is given below.

The file server management DB unit 1603 manages information relating to the file servers 1202 to 1204 that store files (FIG. 13A). The path management DB unit 1604 manages data information that serves to carry out file management by the web application unit 1300 of the central management server 1200. Specifically, the path management DB unit 1604 manages information relating to file data and folders saved in the file servers 1202 to 1204 managed by the web application unit 1300. In the present invention, file data and folders managed by the web application unit 1300 are collectively referred to as an "entity."

The route information management DB unit 1605 retains information that serves to define the connection of tasks using "route" as a unit. The task information management DB unit 1606 defines the various processing steps in the unit of tasks, and retains information relating to tasks. The scale adjustment unit 1607 has the function of adding on to or downsizing the central management server. In the case where add-on is conducted, processing is performed in which a new central management server is activated, and connected to the network 1210. Processing for the case where downsizing is conducted is described in detail in a second embodiment.

The file management conducted by the central management server 1200 and the database server 1205 is described in detail as follows. The file saving unit 1304 of the central management server 1200 has the function of receiving a file saving request from the scan server 101 or the task server 103 or 104, and multiplexing and saving the file in the file servers 1202 to 1204. With respect to multiplicity, an integer of 1 or more can be designated by the scan server 101 or the task server 103 or 104 that is the calling source; the case where multiplicity is 1 is synonymous with the case where saving is conducted without multiplexing. The maximum value of multiplicity is the number of shared folders existing in the file servers 1202 to 1204 (FIG. 13); anything above that level is ignored.

First, file saving processing is described. When the file saving unit 1304 receives a request for initial data saving from the scan server 101, the file server to be the destination of saving is first selected from among the file servers currently in operation. At this time, the file saving unit 1304 conducts selection in proportion to the designated multiplicity sequentially from the file server with the smallest amount of saved folders or data. This is done in order to equalize the volumes of the respective file servers 1202 to 1204. For example, in the case where multiplicity is 3, the file saving unit 1304 not only saves the initial data to its own server, but also saves the pertinent initial data to the respective file servers A, B, C. Therefore, in the case where the user has set a high priority on the initial data by flag setting or the like, it is possible to more securely protect the data, because the initial data is saved in three file servers. A request for initial data saving from the scan server 101 includes multiplicity, task ID, and file data number. The file saving unit 1304 generates a file group ID, and generates a file path for the file server that is the saving destination based on the file group ID, the task ID, and the number. Note that, in the case where initial data is saved, the generated file group ID is returned to the scan server 101 that is the calling source.

In the case where the file saving unit 1304 receives a file saving request from the task server 103 or 104 that has conducted task processing, the request includes the multiplicity, file group ID, task ID, and file data number. The file saving unit 1304 obtains the file server in which the initial data is saved and which has a file group ID identical to the file group ID included in the received request from the path management DB unit 1604. The file saving unit 1304 saves the file that was subjected to task processing in the file server in which the initial data is saved.

In order to save a file in a file server, the file saving unit 1304 transmits a saving destination file path and file data to the back-end unit 1310. In the case where the back-end unit 1310 confirms the feasibility of communication with the saving-destination file server, and finds that communication is possible, the file is saved in the saving-destination file server. In the case of multiple saving, the aforementioned processing is repeated according to the multiplicity. The back-end unit 1310 returns a result to the file saving unit 1304 when saving of all files is complete. The file saving unit 1304 adds entries relating to the saving destination file path in the path management DB unit 1604 according to the multiplicity (FIG. 13B).

FIG. 13A shows an exemplary management table managed by the file server management DB unit 1603. An ID 2001 is information for uniquely identifying a file server in the web application unit 1300. A host name 2000 shows a unique address of a file server on a network 1810, and is used when the web application unit 1300 accesses the file servers 1202 to 1204 through the back-end unit 1310. A status 2003 is a value which shows the feasibility of communication with a file server existing at the host name 2002 through the back-end unit 1310 by the web application unit 1300, and adopts 1 in the case where normal communication is possible, and −1 in the case where new write-in is impossible. A shared folder name 2004 is a name of a shared folder created by the file servers 1202 to 1204. The full path of a shared folder created by the file servers 1202 to 1204 is obtained from the host name 2002 and the shared folder name 2004. Information identical to that of the file servers is added to this DB, because the central management servers 1200 and 1201 also operate as servers that save file data, as described below.

FIG. 13B shows an exemplary management table managed by the path management DB unit 1604. A file ID 2010 is information for uniquely identifying an entity in the file servers 1202 to 1204. A file group ID 2011 is information for grouping various entities with an associated job. Accordingly, entities generated by the same job will have the same file group ID 2011. A task ID 2012 is a task ID of a task associated with a given entity, and provides the value of either a "folder" representing a folder, or an "init" representing a file stored pursuant to a request from the scan server 101. In the present invention, a file stored pursuant to a request from the scan server 101 is referred to as "initial data". A number 2013 shows a file number of a file generated by a given task. A path 2014 shows a full path of a storage destination of an entity, and is used when the web application unit 1300 accesses an entity through the back-end unit 1310. A host name 2015 shows a host name of a file server that is a storage destination of a given entity. A creation date 2016 and an expiration date 2017 show a creation date and an expiration date of a given entity.

Figure 14:
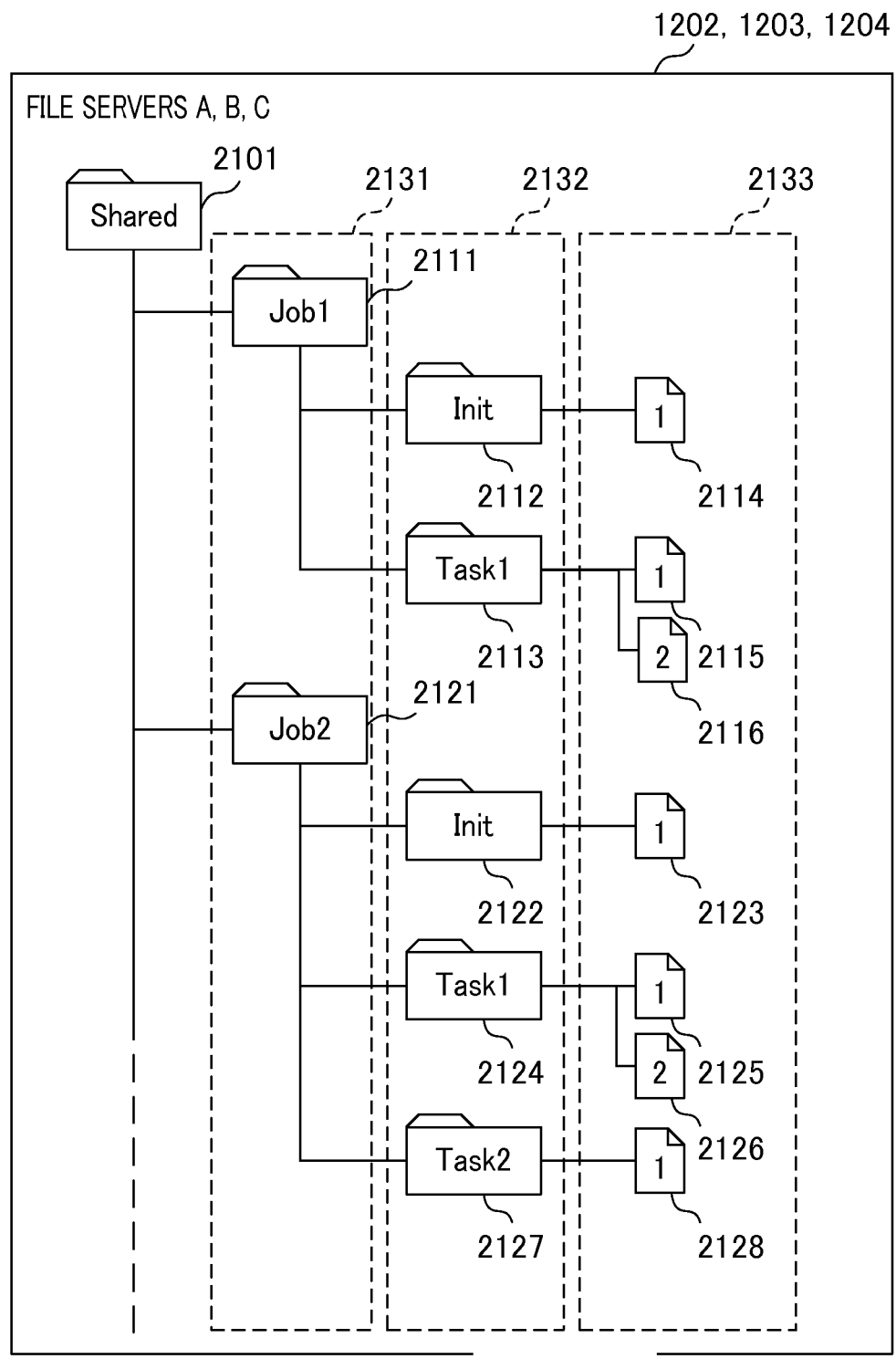
FIG. 14 is a diagram which illustrates a hierarchical structure of an entity that is saved by a file server.

The file servers 1202 to 1204 function as storage devices that store files managed by the web application unit 1300. FIG. 14 shows a hierarchical structure of folders of the file servers 1202 to 1204. A folder 2101 is a shared folder, and is accessible by the web application unit 1300 through the back-end unit 1310. There is at least one shared folder 2101 for each server, and it matches the shared folder name 2004 of the file server management DB unit 1603. In the present invention, the depth of the shared folder 2101 is considered as 0. The folder names of the respective folders 2111 and 2121 of the folder group 2131 of depth 1 directly underneath the shared folder 2101 correspond to the file group ID 2011. The folder names of the respective folders 2112, 2113, 2122, 2124, and 2127 of the folder group 2132 of depth 2 directly underneath 2111 and 2121 correspond to the task ID 2012. Files managed by file management are saved in the folder group 2133 of depth 3. Specifically, a file 2114 directly underneath "Init" 2112 is initial data transmitted from the scan server 101. Files 2115 and 2116 directly underneath Task 1 2113 are data resulting from task processing conducted by the task server 103. Note that, the file name in this instance corresponds to the number 2013.

Next, a description is given of file acquisition processing. The file acquisition unit 1305 returns the files saved in the file servers 1202 to 1204 in response to file acquisition requests of the task servers 103 and 104 to the task servers 103 and 104. Specifically, the file acquisition unit 1305 issues inquiries to the path management DB unit 1604 based on the task IDs in response to the file acquisition requests of the task servers 103 and 104, and acquires the file paths of the storage destinations tied to the task IDs. The file acquisition unit 1305 transmits the file paths of the storage destinations to the back-end unit 1310. The back-end unit 1310 confirms the feasibility of communication with the storage-destination file servers, and returns the file data to the file acquisition unit 1305 if communication is possible. The file acquisition unit 1305 returns the file data returned from the back-end unit 1310 to the task servers 103 and 104.

Note that, in the case where the file saving unit 1304 of the central management server 1200 saves file data, the file data may be returned to the task server 103 or 104 from the central management server 1200. For example, in the case where a file is saved by the central management server 1200 and the file server A 1202 in file saving processing, a state may be assumed where the central management server 1201 has received an acquisition request for the pertinent file from the task server 103 or 104. Under such circumstances, with respect to the file acquisition unit 1305 of the central management server 1201, the file saving unit 1304 has not saved the file. Consequently, the file acquisition unit 1305 of the central management server 1201 specifies the file server A 1202 in which the file requested by the task server 103 or 104 is saved via a database server. The file is then acquired from the file server A 1202, and returned to the task server 103 or 104.

Next, a description is given of file deletion processing. The file deletion unit 1306 deletes entities stored in the file saving unit 1304 and the file servers 1202 to 1204 in response to deletion requests from the scan server 101 and the task servers 103 and 104. Upon receipt of a request from the scan server 101 or the task server 103 or 104, the file deletion unit 1306 issues an inquiry to the path management DB 1604 based on the file group ID, task ID, and number included in the request. The file deletion unit 1306 transmits all file paths relating to the entity of the acquired storage destination to the back-end unit 1310. The back-end unit 1310 confirms the feasibility of communication with the storage-destination file server, and deletes the entity if communication is possible. The back-end unit 1310 returns the result to the file deletion unit 1306 when deletion of the entity is completed. When deletion of the entity is successful, the file deletion unit 1306 deletes the entry relating to the deleted entity from the path management DB unit 1604.

Next, a description is given of job information updating processing. The job information updating unit 1301 receives a job information updating request together with a result notification from the task server 103 or 104 through the external I/F 1320. The job information updating unit 1301 updates the job information managed by the job information management DB unit 1602 of the database server 1205 using the received job information. FIG. 15 shows a management table for job information stored by the job information management DB 1602 of the database server 1205. As shown in FIG. 15, the updated information cites a current task ID 1704, a status 1705, and a final updating time 1706. Prior to updating the current task ID 1704, the job information updating unit 1301 acquires the next task ID in the pertinent route ID from the route information management DB 1605 of the database server 1205. By means of the acquired task ID, the current task ID 1704 is updated. Moreover, the status 1705 is updated to 0, and the final updating time 1706 is updated to the current time.

FIG. 16 shows an example of information managed by the route information management DB unit 1605. A route ID 1401 is an ID which uniquely identifies a route. A sequence number 1402 retains which task is to be executed at which sequential number in the route. A task ID 1403 retains which task is to be executed. For example, the route ID 1401 defines a route 002 with data 1413, 1414, 1415, and 1416. Reference numeral 1413 is the task to be executed first, and the task ID 1403 executes the task of Task 1. Similarly, the definitions are such that Reference numeral 1414 is the task to be executed second where the task of Task 3 is executed, and Reference numeral 1415 is the task to be executed third where the task of Task 5 is executed.

Returning to FIG. 15, a description is given of file data retained in the job information management DB unit 1602. A job ID 1701 is an ID that is uniquely assigned to each job datum. A route ID 1702 stores a route ID corresponding to a template selected in the ticket creation screen 601 shown in FIG. 6. A file group ID 1703 is an ID issued from the web application unit 1300. A current task ID 1704 is a task ID which shows a task to be processed in the job. The task server 103 or 104 checks the current task IDs 1704, selects the row where it matches the task ID assigned to its own task server, and conducts processing. With respect to this ID, when processing of the pertinent task is completed, the job information updating unit 1301 updates it to the task ID of the next task of the pertinent route ID.

In a status 1705 is set a value representing processing standby (0), execution in progress (1), or error occurrence (2). When the task server 103 or 104 selects a job, a row where the status is 0 is selected. By this means, it is possible to prevent a situation where multiple task servers process the same task. After the task server 103 or 104 has selected a job, the task server 103 or 104 changes the status 1705 to 1 by a job status changing unit 1605 through the external I/F 1320. A final updating time 1706 is updated when the task server 103 or 104 has executed some type of processing with respect to the pertinent job. Here, "some type of processing" is status updating processing or job acquisition processing. When the task server 103 or 104 acquires a job, if there are multiple instances where job information is equal to its own task ID, the job with the oldest final updating time 1706 is selected. By this means, it is possible to process all jobs in a standard manner. A parameter 1707 records setting information that was set in the detailed settings screen 605, setting information that is delivered by the task server 103 or 104 to the other task server 103 or 104, and the like.

Figure 17:
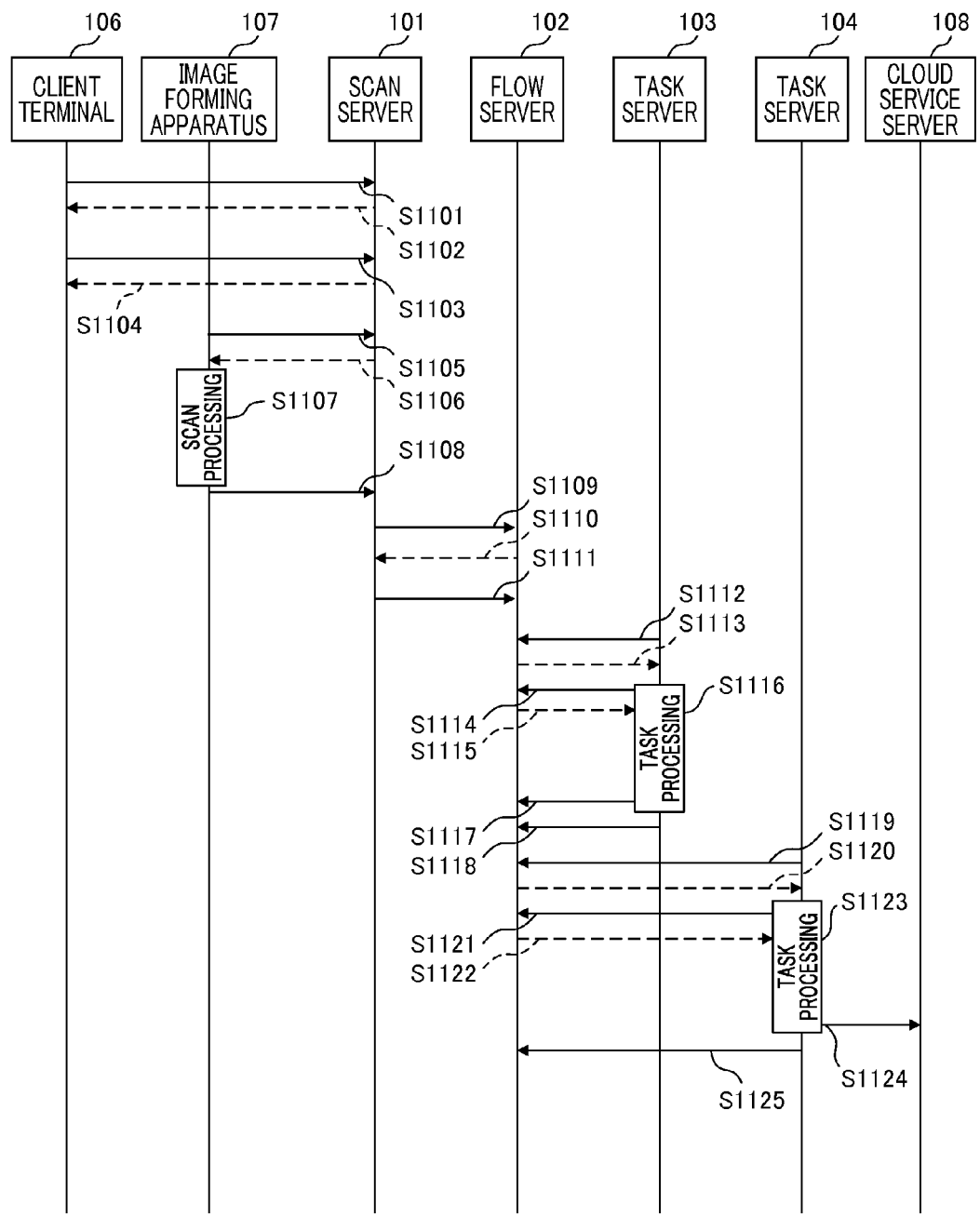
FIG. 17 is a sequence diagram which describes an example of operational processing of the load dispersion system of the present embodiment.

FIG. 17 is a sequence diagram which describes an example of operational processing of the load dispersion system of the present embodiment. First, the web browser 301 with which the client terminal 106 is provided transmits a scan ticket creation screen request to the scan service server group 101 (step S1101). Subsequently, the ticket creation unit 511 with which the scan service server group 101 is provided generates a scan ticket creation screen in accordance with the scan ticket creation screen request, and returns a response to the web browser 301 (step S1102). Specifically, the ticket creation unit 511 acquires a scan ticket template that is registered in the template management DB 503 from the template management unit 516. The ticket creation unit 511 then creates a scan ticket creation screen including the template name included in the acquired template, and transmits it to the web browser 301. The web browser 301 displays the received scan ticket creation screen (FIG. 5).

Next, the web browser 301 transmits a scan ticket creation request to the scan server 101 in accordance with user manipulation of the scan ticket creation screen (step S1103). The ticket creation unit 511 with which the scan server 101 is provided creates a scan ticket in accordance with the scan ticket creation request. The ticket management unit 515 also saves the created scan ticket in the ticket management DB 502, and returns a response to the web browser 301.

Next, the scan software unit of the image forming apparatus 107 transmits a ticket list acquisition request to the ticket list unit 512 by the external I/F 514 (step S1105). A ticket list acquisition request is a request for obtaining transmission of a ticket list. The ticket list unit 512 generates a ticket list in accordance with the ticket list acquisition request, and returns it to the web browser 301 (step S1106). The web browser 301 displays the returned ticket list in the ticket list screen (FIG. 6).

Next, the scan software unit of the image forming apparatus 107 performs scan processing, and acquires image data in accordance with user manipulation of the ticket list screen (step S1107). The scan software unit then transmits the image data acquired by the aforementioned scan processing, and the scan ticket selected by user manipulation of the ticket list screen to the scan receiving unit 513 of the scan server 101 (step S1108).

Next, the scan receiving unit 513 inputs the received image data to the flow server 102 (step S1109). In the case where the flow server 102 is able to correctly received the image data, the flow server 102 responds to the scan server 101 with a file group ID corresponding to the received image data (step S1110). Subsequently, the scan receiving unit 513 of the scan server 101 transmits the file group ID and the scan ticket to the flow server 102. By this means, the job is input into the flow server 102 (S1111).

Next, a description is given of the processing whereby the flow server 102 delivers a task in response to a task acquisition request from a task server. The task acquisition units 1011 of the respective task servers (103, 104) periodically issue inquiries (task acquisition requests) to the flow server 102. The task acquisition unit 1011 then acquires a task that can be processed by the task server (steps S1112, S1113, S119, S1120).

The data acquisition unit 1012 of the task server acquires the image data to be processed that corresponds to the task acquired by the task acquisition unit 1011 from the flow server 102 (steps S1114, S1115, S1121, S1122). The task processing unit 1015 of the task server executes various types of processing (task processing) on the image data acquired from the flow server 102 (steps S1116, S1123).

In the example shown in FIG. 17, the task processing unit 1015 of the task server 103 saves the result of the task processing of step S1116 in the flow server 102 via the data saving unit 1013 (step S1117). The task processing unit 1015 of the task server 104 conducts data transmission of the result of the task processing of step S1123 to the cloud service server group 108 (step S1124). The task status notification units 1014 of the task servers (103, 104) notify the flow server 102 of the termination results of the series of task processing steps (step S1118, S1125).

Figure 18:
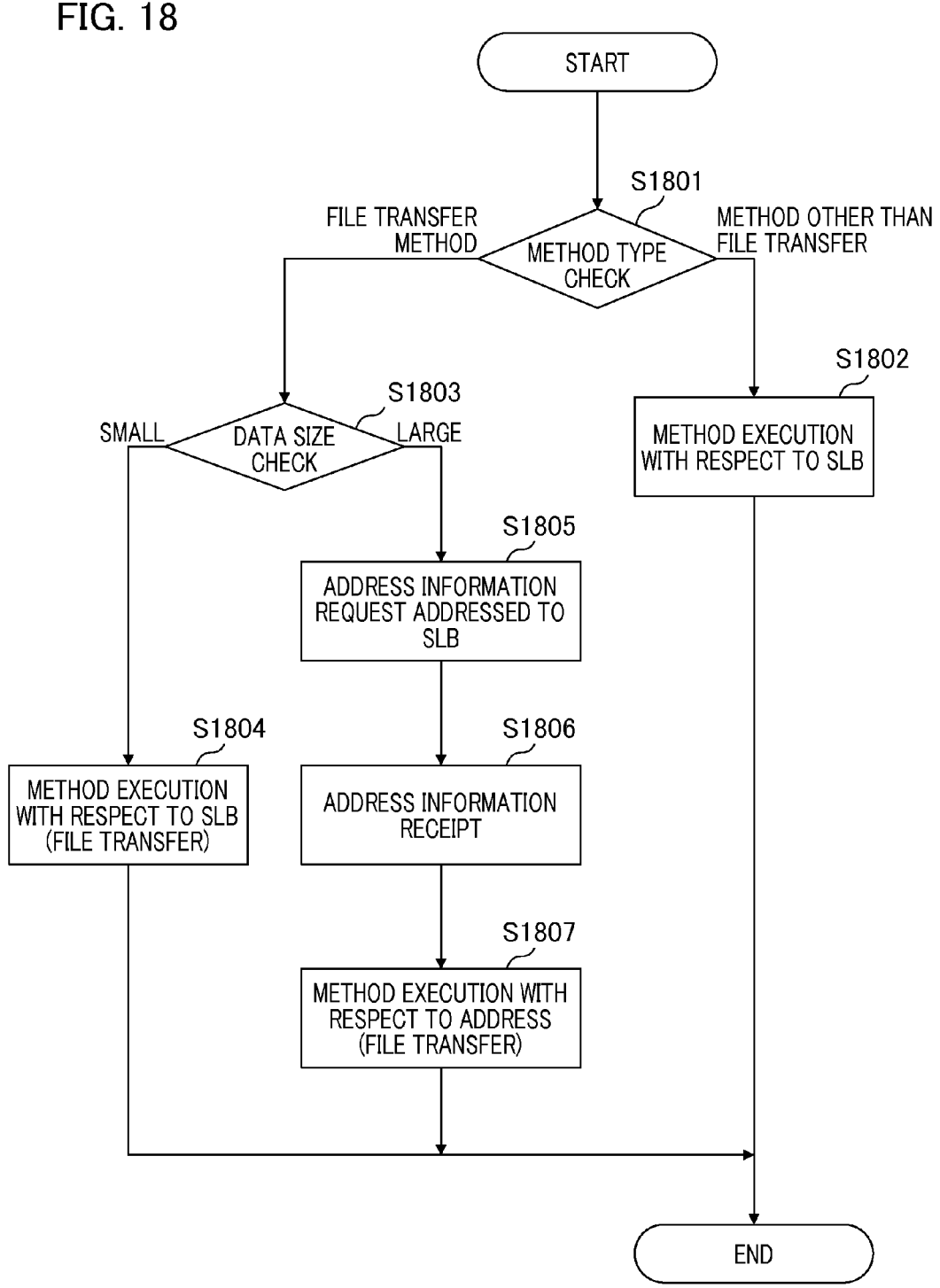
FIG. 18 is a flowchart which represents operations when a scan server communicates with a central management server.
Figure 19:
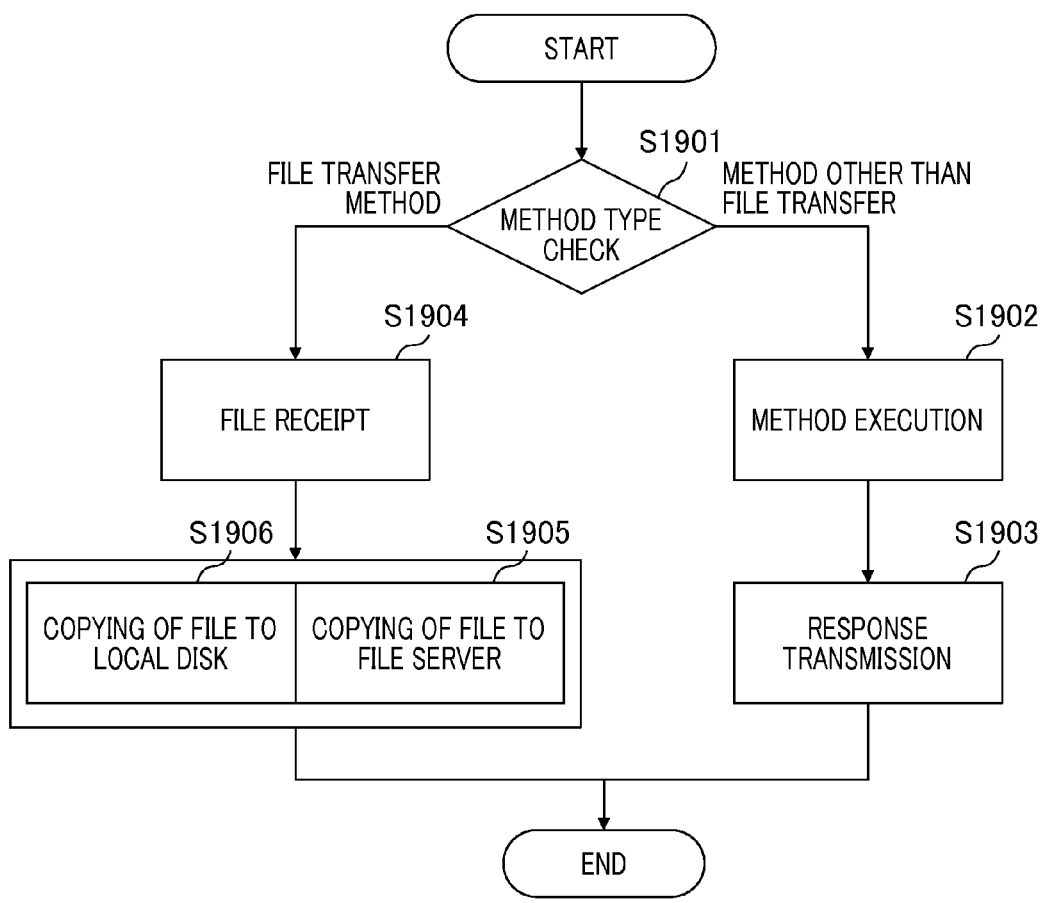
FIG. 19 is a flowchart which represents operations conducted by a central management server upon receipt of a communication from a scan server.

Next, using FIG. 18 and FIG. 19, a description is given of the detailed mechanism whereby the scan server 101 and the flow server 102 communicate. FIG. 18 is a flowchart which represents operations when the communication unit 517 of the scan server 101 communicates with the web application unit 1300. FIG. 19 is a flowchart which represents operations conducted upon receipt of a communication by the web application unit 1300 of the flow server 102 from the scan server 101.

First, in S1801 of FIG. 18, the communication unit 517 of the scan server 101 first checks the type of method included in the request transmitted to the web application unit 1300. In S1802, the communication unit 517 executes callout of the method with respect to the SLB 1206 in the case of a method other than file transfer, i.e., a method that does not involve binary transfer. Here, the SLB 1206 appropriately sorts the method request to the central management server 1200 or 1201, and transmits the method request to the external I/F 1320 of one of the central management servers. At this time, the file saving unit 1304 of the central management server discriminates the type of method from the method request in S1901 of FIG. 19. As it is a method other than file transfer in this instance, the method requested from the file saving unit 1304 is executed in S1902, and the result is returned to the scan server 101 via the SLB 1206 as a response in S1903.

On the other hand, in the case where it is discriminated in S1801 that it is a file transfer method, the communication unit 517 checks the size of the file data to be transferred in S1803. At this time, if the file size is of a certain fixed size or less, the communication unit 517 functions as a transfer unit that transfers data in S1804, and executes the method—i.e., transfers the file—vis-à-vis the SLB 1206. The SLB 1206 then appropriately sorts the transferred file data to the central management server 1200 or 1201, and transmits it to the external I/F 1320 of the central management server. At this time, the file saving unit 1304 checks the type of method in S1901, and because it is a file transfer method, the file saving unit 1304 receives the file via the external I/F 1320 in S1904.

Next, the file saving unit 1304 executes processing that saves the received file. At this time, if the file saving unit 1304 conducts saving only on the specified file server, in the case where the pertinent server crashes, there is a risk that the file data would be unobtainable, and that the task server 103 that requires it would be unable to execute the task/job. Thus, in the present embodiment, the file saving unit 1304 saves the received file data on two different servers, thereby incorporating a mechanism that avoids the aforementioned risk. The file saving unit 1304 conducts double write-in of S1905 and S1906 as a file saving thread. At this point, if two file servers on the network were designated as write-in destinations, the network bandwidth would be doubled for use. Thus, in S1905, the file saving unit 1304 of the web application unit 1300 selects an optional server from among the file servers A/B/C on the network, and saves the file. On the other hand, in S1906, the file is saved to a local disk of the central management server 1200 or 1201 that executes the method, i.e., to the file saving unit 1304. In S1905 and S1906, the web application unit 1300 adds the saved file information as a management subject to the path management DB 1604 (FIG. 13A). By this means, the multiplicity of the file can be increased without extra use of network bandwidth.

In the case where the communication unit 517 discriminates that the file size is of a certain fixed size or above in S1803, the file saving unit 1304 transmits an address information request to the SLB 1206 in S1805. Here, the SLB 1206 appropriately sorts the address information request to the central management server 1200 or 1201, and requests the file saving unit 1304 of the web application unit 1300 to provide the address information. In this instance, address information signifies information such as IP address and host name which can uniquely identify a server that is the target of communication when communication is conducted between servers.

At this time, the file saving unit 1304 discriminates in S1901 that the method is other than file transfer, and that it relates to an address information request. The file saving unit 1304 acquires the address information of the server hosted by the web application unit 1300 in S1902, and returns the address information to the communication unit 517 via the SLB 1206 as a response in S1903. That is, the file saving unit 1304 functions as a transmission unit that transmits positional information to the SLB 1206 upon receipt of an acquisition request for positional information. The communication unit 517 receives the address information in S1806, and executes file transfer to that address in S1807. That is, the communication unit 517 functions as a determination unit which determines—according to the file data to be transferred—the transfer method of transferring the file data the SLB 1206, or transferring the file data to a central management server determined by the SLB 1206 without mediation of the SLB 1206. By this transfer method, as the communication unit 517 directly transfers the file to the designated central management server without mediation of the SLB 1206, transfer processing is possible which is not affected by the performance limits of the SLB 1206, and which fully uses the bandwidth of the network 1210. The web application unit 1300 discriminates the type of method as a file transfer method in S1901, and receives the file data to be transferred in S1904. The file saving unit 1304 saves the received file in two different servers in S1905 and S1906, as stated above.

Note that, the discrimination standard of "a fixed size" may be dynamically determined in S1803. For example, as a simultaneous access number is determined from the amount of jobs existing at the same time, the value obtained by dividing the processing performance (the file size capable of transmission in a fixed period) of the SLB 1206 by the simultaneous access number is the average file size capable of transmission by the SLB 1206. This size may be used in the discrimination of S1803 as the aforementioned "fixed size."

According to the load dispersion system of the present invention described above, by directly transmitting data to a server from a transmission source without mediation of an SLB when data of a fixed size or above is transmitted and received, it is possible to improve processing speed while implementing server load dispersion by an SLB. In other words, while server load dispersion is being conducted by the SLB 1206, it is possible to conduct efficient communication so that bandwidth limitations due to performance limits of the SLB 1206 are not experienced. In the case where the transfer data is small enough so as not to be affected by performance limits of the SLB 1206, it is possible to dynamically conduct efficient communication via the SLB 1206 according to method type and transfer data size so that callout frequency is not needlessly increased. With respect to retention of transferred file data in two different servers, by saving to a local disk in one case, it is possible to conduct efficient communication that economizes network bandwidth while also conducting double retention of the file.

Second Embodiment

In the first embodiment, there is no need to limit the central management servers to two. In the case of a large job flow rate, scale-out can be conducted by newly connecting central management servers to the network. Of course, when the job flow rate is small, it is necessary to have a mechanism for conducting scale-in by reducing the number of central management servers, because start-up of many servers would be wasteful.

However, there is the case where file data may exist in the local disk of a central management server that is eliminated during scale-in, creating the need to withdraw it to a separate file server. At such times, when all files are moved to a specified file server, the case may arise where the same file multiply exists in the same file server. In this case, if that file server were to crash, both of the doubly retained files would be simultaneously lost, rendering the double retention meaningless. When conducting scale-in of central management servers, for each file retained by a central management server that is eliminated, it is therefore necessary to conduct withdrawal by selecting a file server that does not retain the same file as the destination.

Figure 20:
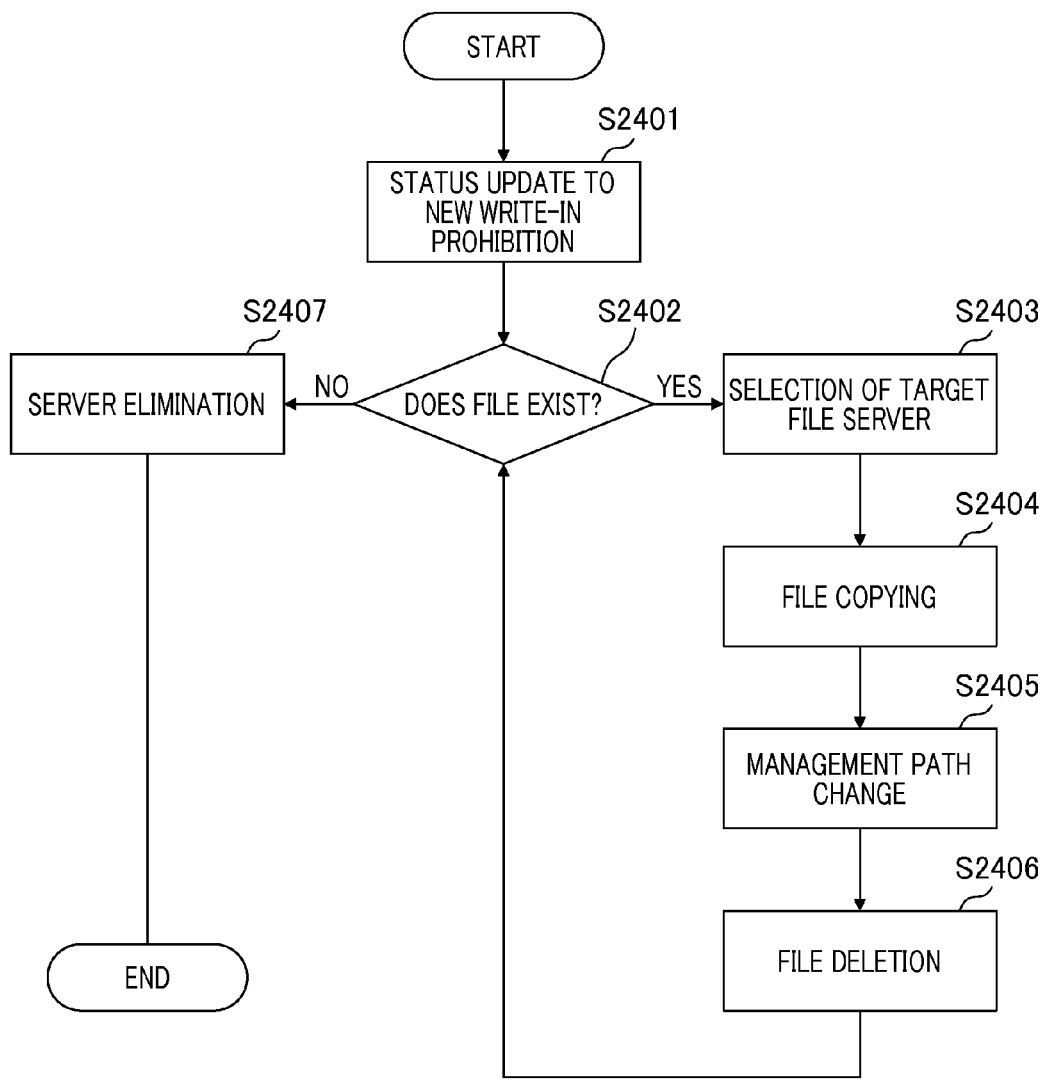
FIG. 20 is a flowchart of central management server scale-in processing in a second embodiment.

With respect to scale-in processing of central management servers, the database server 1205 shown in FIG. 12 functions as a management device, and the scale adjustment unit 1607 executes scale-in processing through the network 1210 in the case where, for example, a transfer processing volume of communication data is below a threshold value. FIG. 20 is a flowchart of central management server scale-in processing executed by the scale adjustment unit 1607. First, the scale adjustment unit 1607 functions as a prohibition unit, engendering a state in S2401 where a central management server to be eliminated is prohibited from new write-in. Specifically, the scale adjustment unit 1607 accesses the file server management DB 1603, and changes the value of the status 2003 (see FIG. 20) of the central management server to be eliminated to −1. Next, in S2402, the scale adjustment unit 1607 checks whether or not file data exists in the central management server to be eliminated. In the case where file data exists, the scale adjustment unit 1607 functions as an extraction unit which extracts a storage device other than a storage device which stores the same data. In short, with respect to a given file in a central management server to be eliminated, the scale adjustment unit 1607 consults the file server management DB 1603 and the path management DB 1604 to extract a file server in which the same file does not exist in S2403. By this means, it is possible to prevent deletion of file data in the case where file data remains in a central management server to be eliminated.

Specifically, the scale adjustment unit 1607 extracts host names for which the same file exists with respect to the three items of the file group ID 2011, the task ID 2012, and the number 2013 shown in FIG. 13B. The scale adjustment unit 1607 then references FIG. 13A to arbitrarily select a file server with a different host name. In S2404, the scale adjustment unit 1607 copies the aforementioned file to the selected file server. In S2405, the scale adjustment unit 1607 carries out a management path change. Specifically, with respect to the file in question, the path 2014 and the host name 2015 of FIG. 13B are changed to those of the addressee to which copying is conducted in S2404. In S2406, the scale adjustment unit 1607 deletes the original file.

Subsequently, returning again to S2402, the scale adjustment unit 1607 again checks whether or not file data exists in the central management server to be eliminated. Thereafter, S2402-S2406 are repeated so long as file data exists. When it is confirmed in S2402 that no file exists in the central management server to be eliminated, the scale adjustment unit 1607 functions as a management unit in S2407, and shuts down the central management server to be eliminated, and deletes it from this system. The scale adjustment unit 1607 may create and delete file servers by the same processing.

As described above, when conducting scale-in of central management servers, it is possible to maintain a configuration in which the same file is doubly retained in multiple file servers.

Third Embodiment

In the configuration for job input from a scan server in the first embodiment, by switching between method execution via the SLB 1206 and direct execution with respect to the address of a target server, switching was dynamically conducted between avoidance of bandwidth restriction by the SLB 1206 and reduction of callout frequency. However, a scenario for read-out of file data was not included in the first embodiment.

Figure 21:
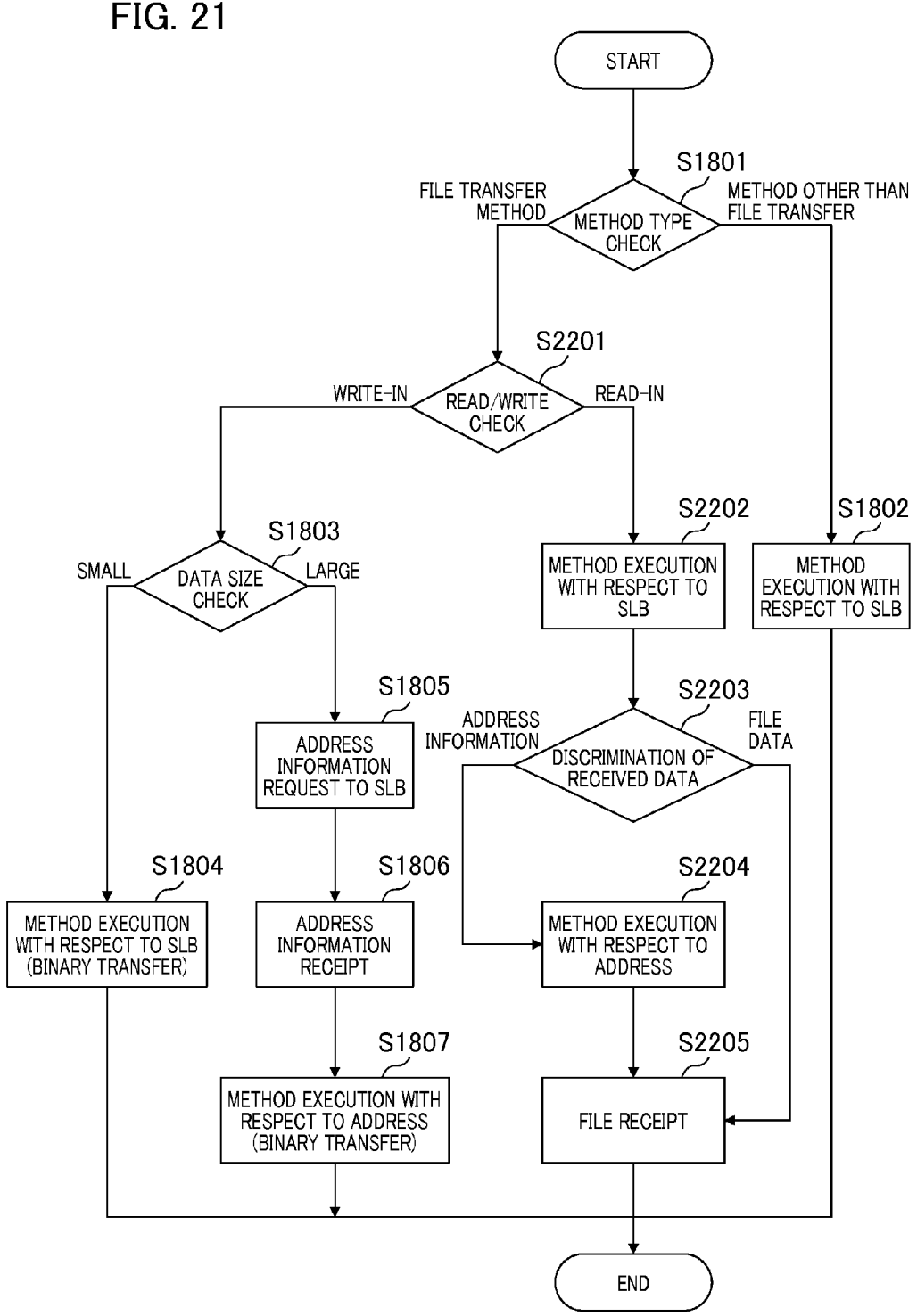
FIG. 21 is a flowchart which represents operations when a scan server communicates with a central management server in a third embodiment.
Figure 22:
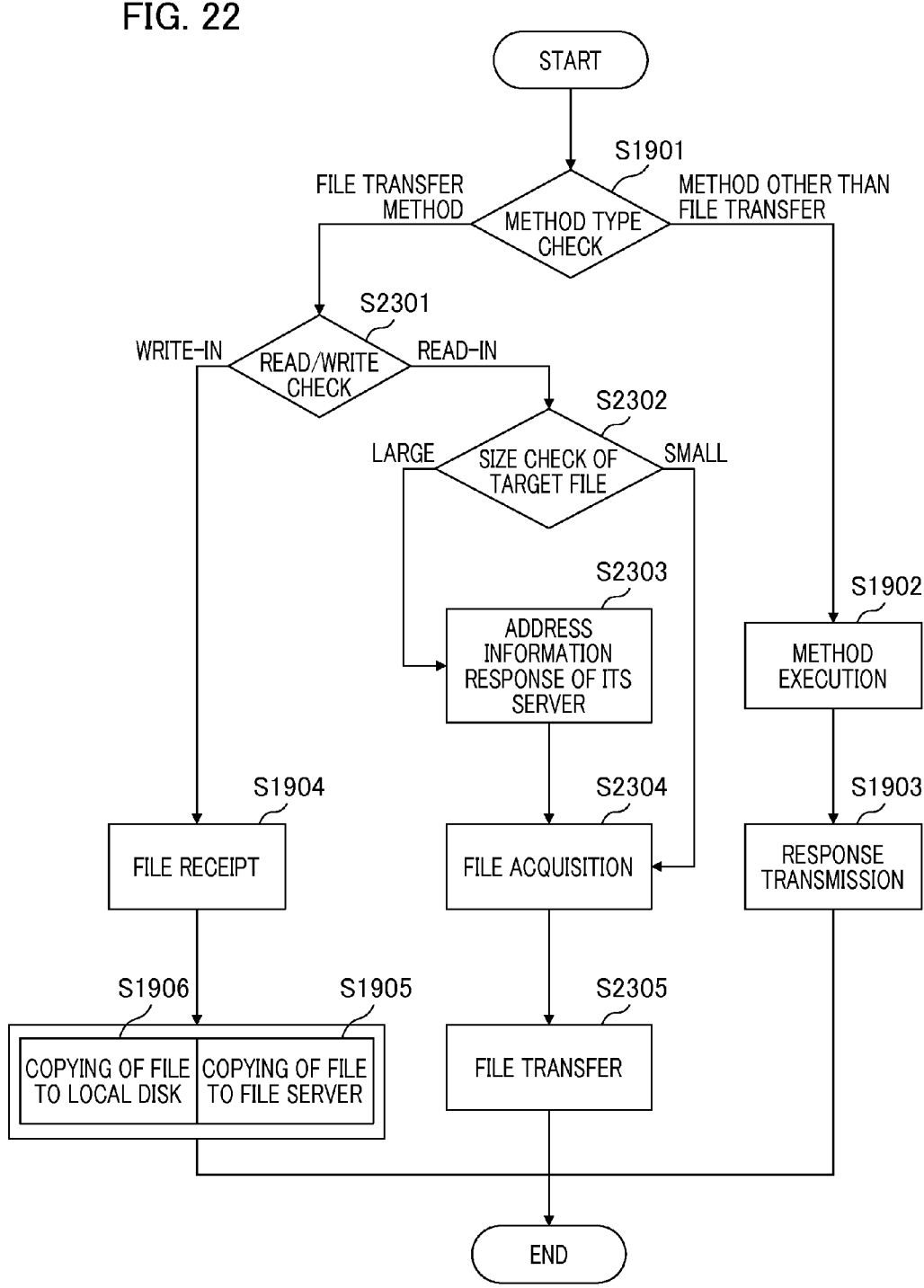
FIG. 22 is a flowchart which represents operations conducted by a central management server upon receipt of a communication from a scan server.

FIG. 21 and FIG. 22 are flowcharts which respectively expand FIG. 18 and FIG. 19 in a system where read-out of file data also exists. Specifically, FIG. 21 is a flowchart which represents operations when the communication unit 1016 of the task server 103 or 104 communicates with the web application unit 1300. FIG. 22 is a flowchart which represents operations conducted by the web application unit 1300 of the flow server 102 upon receipt of a communication from the task server 103 or 104.

S1801 to S1802 of FIG. 21 are identical to FIG. 18, except that the performance agent is changed from the scan server 101 to the task server 103 or 104. In the case where it is discriminated in S1801 that the type of method is a file transfer method, the communication unit 1016 discriminates in S2201 whether the file transfer method is a write-in method or a read-in method. In the case of a write-in method, the communication unit 1016 executes S1803 to S1807 in the same manner as in FIG. 18.

On the other hand, in the case where a file read-in method is discriminated in S2201, the communication unit 1016 issues an instruction for execution of the method to the SLB 1206 in S2202. By this means, callout is conducted through the SLB 1206 for an API read-in method of the web application unit 1300 of the appropriate central management server.

At this time, the file acquisition unit 1305 of the web application unit 1300 discriminates a file transfer method in S1901 of FIG. 22, and a read-in method in S2301. That is, the file acquisition unit 1305 functions as a specification unit which specifies either an acquisition request that seeks acquisition of file data, or a transfer request that seeks transfer of data processed by a task server to a central management server. In S2302, the file acquisition unit 1305 accesses the file server or the central management server in which the target file is saved to check the size of the file that is the subject of read-in. In the case where the size of the file is larger than a certain fixed threshold value, the file acquisition unit 1305 acquires in S2303 the address of its server as the transfer destination. Upon generation of an exception, the file acquisition unit 1305 then incorporates the address information as an attribute of the exception, and responds to the communication unit 1016 via the SLB 1206. Upon receiving the communication, the communication unit 1016 discriminates in S2203 of FIG. 21 whether the received data is file data, or whether it is an exception including address information. In the case where exception information is discriminated, the communication unit 1016 again executes a read-in method vis-à-vis the acquired address in S2204. At this time, the communication unit 1016 functions as an acquisition unit, and in the case where the file data exceeds a predetermined data volume, the data is directly acquired from the central management server determined by the SLB 1206. The file acquisition unit 1305 acquires the target file from the file server in S2304, and transfers the acquired file to the communication unit 1016 in S2305. The file data transferred to the communication unit 1016 is received in the web application unit 1300.

On the other hand, in the case where the size of the target file is smaller than a certain fixed threshold value in S2302 of FIG. 22, the web application unit 1300 executes S2304 and S2305, and acquires and transfers the file in the same manner described above. However, in this case, it is transferred to the communication unit 1016 via the SLB 1206. Furthermore, in this case, the communication unit 1016 conducts discrimination with respect to the received data in S2203, discriminates that it is file data, and receives the file as is in S2205.

According to the above, it is possible not only at the time of file write-in but also at the time of file read-in to conduct efficient communication by dynamically switching between avoiding communication via SLB and conducting communication via SLB that does not increase callout frequency according to transfer file size.

As described above, application is possible even in a system other than that specified in the first embodiment. Moreover, this system can also be applied even in a system that is constructed on a separate system such as Windows Azure®.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161931 filed Jul. 20, 2012, which is hereby incorporated by reference herein in its entirety.

What is claimed is:

1. A load dispersion system comprising:
a transfer apparatus which transfers data;
multiple saving apparatuses which save the data that is transferred; and
a dispersion apparatus which determines a saving apparatus to receive transfer of the data in response to a transfer request received from the transfer apparatus and in response to a processing status from among the saving apparatuses,
wherein the transfer apparatus comprises:
at least one processor and memory operatively coupled and cooperating to function as:
a determination unit configured to determine, depending on the data to be transferred, a transfer method that is either to transfer data to the dispersion apparatus, or to transfer data to a saving apparatus determined by the dispersion apparatus without transiting the dispersion apparatus; and
a transfer unit configured to transfer data according to the determined transfer method,
wherein, in a case where the data exceeds a predetermined data volume, the determination unit determines that data is to be transferred to a saving apparatus determined by the dispersion apparatus without transiting the dispersion apparatus, and acquires positional information of the saving apparatus from the dispersion apparatus; and in a case where the data does not exceed a predetermined data volume, the determination unit determines that data is to be transferred to the dispersion apparatus, and
wherein, in a case where the determination unit determines that data is to be transferred to a saving apparatus determined by the dispersion apparatus without transiting the dispersion apparatus, the transfer unit directly transfers the data to the saving apparatus based on the acquired positional information.

2. The load dispersion system according to claim 1, wherein the saving apparatus comprises:
the at least one processor and memory further cooperating to function as:
a transmission unit configured to receive an acquisition request for the positional information from the dispersion apparatus, and transmit the positional information to the dispersion apparatus; and
a saving unit configured to receive the data from the dispersion apparatus or the transfer apparatus, and save the received data,
wherein the saving unit transfers data identical to the data that is saved to a storage apparatus via a network, and instructs it to save the transferred data.

3. The load dispersion system according to claim 2, wherein, in the saving apparatus, the at least one processor and memory further cooperate to function as a specification unit configured to receive requests from the transfer apparatus via the dispersion apparatus, and specify whether the request is an acquisition request that seeks acquisition of data, or a transfer request that seeks transfer to the saving unit of data processed by the transfer apparatus,
wherein, in a case where the request is the acquisition request and the data exceeds a predetermined data volume, the transmission unit transmits positional information of the saving apparatus to the transfer apparatus via the dispersion apparatus, and an acquisition unit with which the transfer apparatus is provided directly acquires the data from the saving apparatus based on the received positional information; and in a case where the request is the acquisition request and the data does not exceed a predetermined data volume, the acquisition unit acquires the data from the transmission unit with which the saving apparatus is provided via the dispersion apparatus,
wherein, in a case where the request is the transfer request and the processed data exceeds a predetermined data volume, the determination unit with which the transfer apparatus is provided acquires positional information of a saving apparatus that is the transfer destination of the processed data via the dispersion apparatus, and directly transfers the processed data to the saving apparatus based on the acquired positional information; and in a case where the request is the transfer request and the processed data does not exceed a predetermined data volume, the determination unit determines that the processed data is to be transferred to the dispersion apparatus.

4. The load dispersion system according to claim 3, wherein the saving unit extracts a storage apparatus in which a saved data volume is below a threshold value from among the multiple storage apparatuses, and instructs the extracted storage apparatus to save data identical to the data saved by the saving unit, and
wherein the transmission unit specifies whether or not the saving unit has saved the data in a case where the data for which the acquisition request was made is to be transmitted to the transfer apparatus; and acquires the data from the storage apparatus that has saved data identical to the data, and transmits it to the transfer apparatus in a case where the saving unit has not saved the data.

5. The load dispersion system according to claim 1, further comprising a management apparatus which manages the saving apparatuses and the storage apparatuses,
wherein the management apparatus comprises:

the at least one processor and memory further cooperating to function as:
- a management unit configured to create or delete the saving apparatuses according to a transfer processing status of the data;
- a prohibition unit configured to determine deletion of the saving apparatuses, and prohibit transfer of the data to a saving apparatus to be deleted, in a case where the transfer processing volume of the data is below a threshold value; and
- an extraction unit configured to check whether or not the data is saved in the saving apparatus that is to be deleted, and in a case where the data is saved, to extract a storage apparatus other than a storage apparatus in which data identical to the data is stored,
- wherein the management unit transfers the data saved in the saving apparatus to be deleted to the extracted storage apparatus, and instructs it to save the data, and also deletes the saving apparatus to be deleted.

6. A method for a load dispersion system comprising:
a transfer apparatus which transfers data;
multiple saving apparatuses which save the transferred data; and
a dispersion apparatus which determines a saving apparatus to receive transfer of the data in response to a transfer request received from the transfer apparatus, and in response to a processing status from among the saving apparatuses, the method comprising:
determining, depending on the data to be transferred, a transfer method whereby the transfer apparatus either transfers data to the dispersion apparatus, or transfers data to a saving apparatus determined by the dispersion apparatus without transiting the dispersion apparatus; and
transferring data according to the determined transfer method,
wherein, in the determining, in a case where the data exceeds a predetermined data volume, it is determined that data is to be transferred to a saving apparatus determined by the dispersion apparatus without transiting the dispersion apparatus, and positional information of the saving apparatus is acquired from the dispersion apparatus; and in a case where the data does not exceed a predetermined data volume, it is determined that data is to be transferred to the dispersion apparatus, and
wherein, in the determining, in a case where it is determined that data is to be transferred to a saving apparatus determined by the dispersion apparatus without transiting the dispersion apparatus, the data is directly transferred to the saving apparatus based on the acquired positional information.

7. A non-transitory storage medium on which is stored a computer program for making a computer execute a method for a load dispersion system comprising:
a transfer apparatus which transfers data;
multiple saving apparatuses which save the transferred data; and
a dispersion apparatus which determines a saving apparatus to receive transfer of the data in response to a transfer request received from the transfer apparatus, and in response to a processing status from among the saving apparatuses, the method comprising:
determining, depending on the data to be transferred, a transfer method whereby the transfer apparatus either transfers data to the dispersion apparatus, or transfers data to a saving apparatus determined by the dispersion apparatus without transiting the dispersion apparatus; and
transferring data according to the determined transfer method,
wherein, in the determining, in a case where the data exceeds a predetermined data volume, it is determined that data is to be transferred to a saving apparatus determined by the dispersion apparatus without transiting the dispersion apparatus, and positional information of the saving apparatus is acquired from the dispersion apparatus; and in a case where the data does not exceed a predetermined data volume, it is determined that data is to be transferred to the dispersion apparatus, and
wherein, in the determining, in a case where it is determined that data is to be transferred to a saving apparatus determined by the dispersion apparatus without transiting the dispersion apparatus, the data is directly transferred to the saving apparatus based on the acquired positional information.

\* \* \* \* \*